United States Patent [19]
Hirohata et al.

[11] Patent Number: 5,771,132
[45] Date of Patent: Jun. 23, 1998

[54] TRACKING ERROR DATA DETECTING APPARATUS AND VTR HAVING THE SAME APPARATUS

[75] Inventors: Naoto Hirohata; Yoshio Mizutani; Katsuyuki Shudo, all of Yokosuka; Yoshio Tokuyama, Yokohama, all of Japan

[73] Assignee: Victor Company of Japan, Ltd., Yokohama, Japan

[21] Appl. No.: 674,833

[22] Filed: Jul. 3, 1996

[51] Int. Cl.⁶ ................................................. G11B 5/584
[52] U.S. Cl. ...................... 360/77.13; 360/10.3; 386/78
[58] Field of Search ..................... 360/10.2, 76, 77.13, 360/109, 84; 368/78

[56] References Cited

U.S. PATENT DOCUMENTS

| | | | |
|---|---|---|---|
| 4,816,927 | 3/1989 | Rijckaert et al. | 360/10.2 |
| 5,353,173 | 10/1994 | Yoo | 360/76 |
| 5,504,642 | 4/1996 | Kinjo et al. | 360/109 |

FOREIGN PATENT DOCUMENTS 7-161102  6/1995  Japan .

*Primary Examiner*—Nabil Hindi
*Attorney, Agent, or Firm*—Michael N. Meller

[57] ABSTRACT

A video tape recorder has a drum for winding a magnetic tape therearound, a capstan motor and a drum motor linked with the drum, both motors for traveling the magnetic tape, and two rotary magnetic heads arranged adjacent to each other relative to the magnetic tape and having two different azimuth angles. One reproduced signal of higher signal level is selected from two modulated signals reproduced by the two magnetic heads to output a detected reproduced signal. Sampling signals are generated each having a signal level corresponding to a signal level of the detected reproduced signal on the basis of the reproduced signal obtained by the selected magnetic head, only during a period while a predetermined one of the two magnetic heads is being selected in response to a head select signal, at each of time intervals obtained by dividing one vertical scanning period into a two or more natural number N. A central axis of the drum is inclined in such a way that the respective signal levels of the sampling signals satisfy a predetermined relative relationship with respect to one another, when recorded signal is reproduced by traveling the magnetic tape at a travel speed different from another travel speed of the magnetic tape in recording operation. And, rotation phase of the capstan motor is changed relative to a reference drum rotation signal of the drum motor.

15 Claims, 26 Drawing Sheets

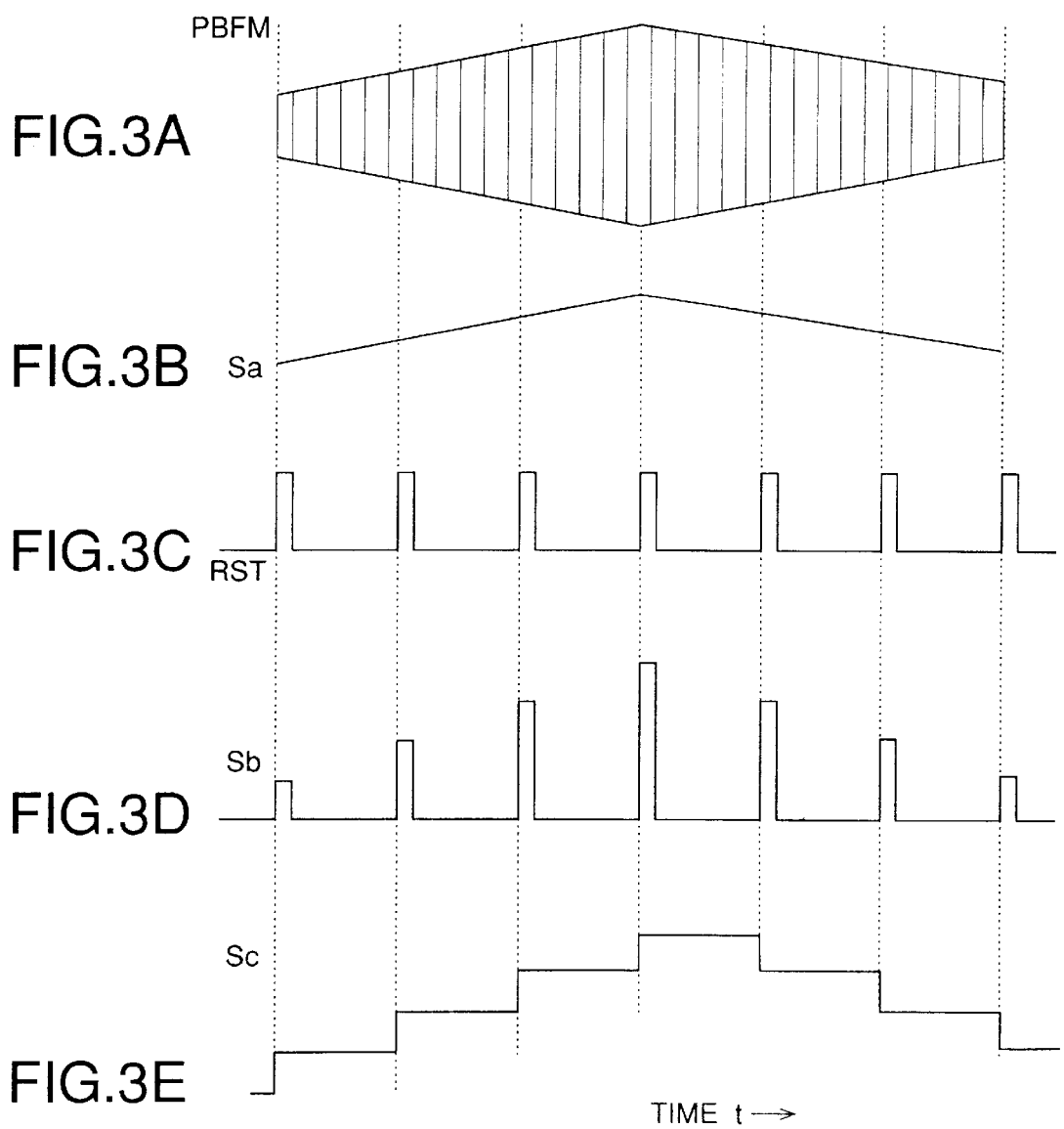

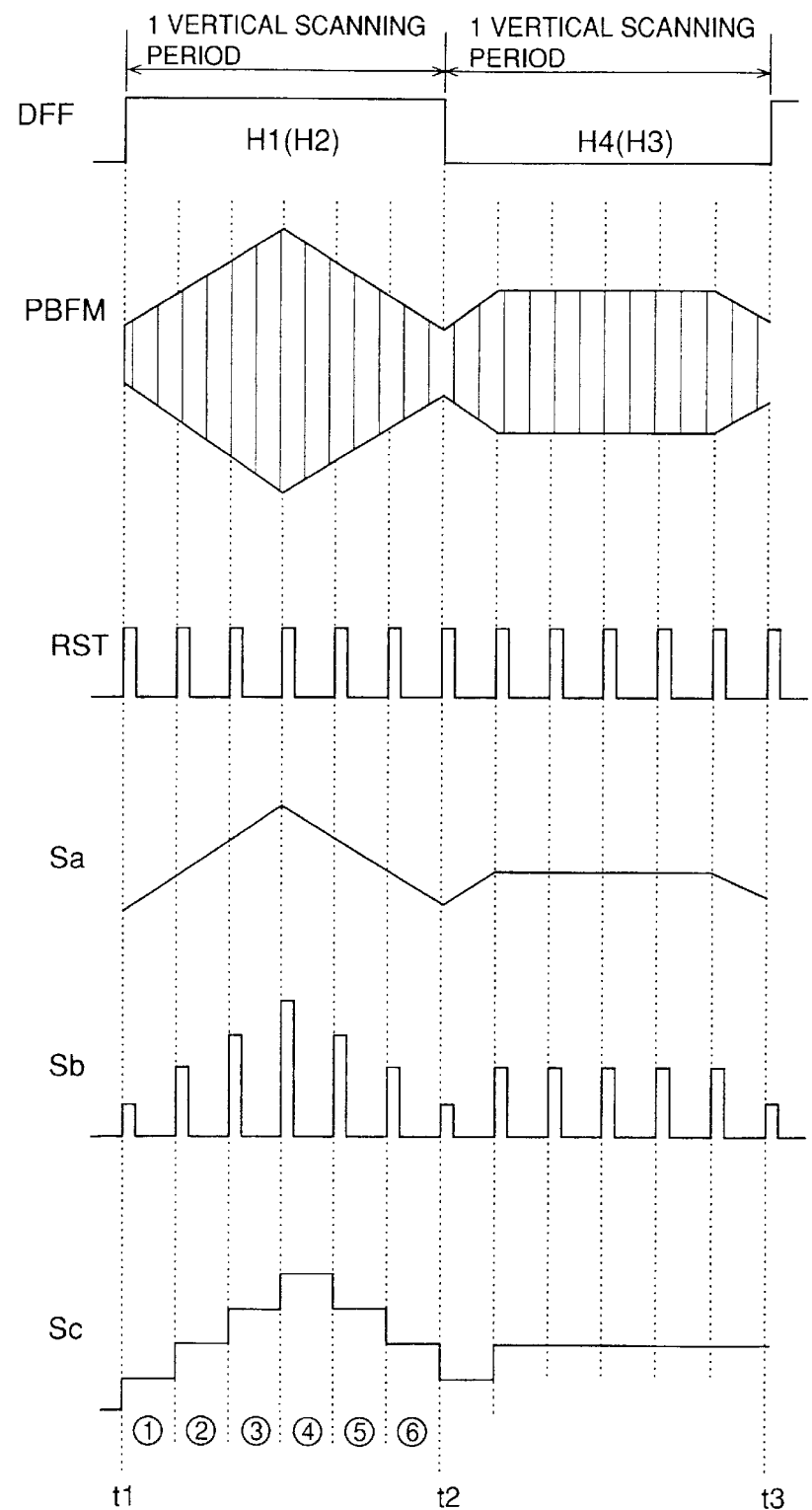

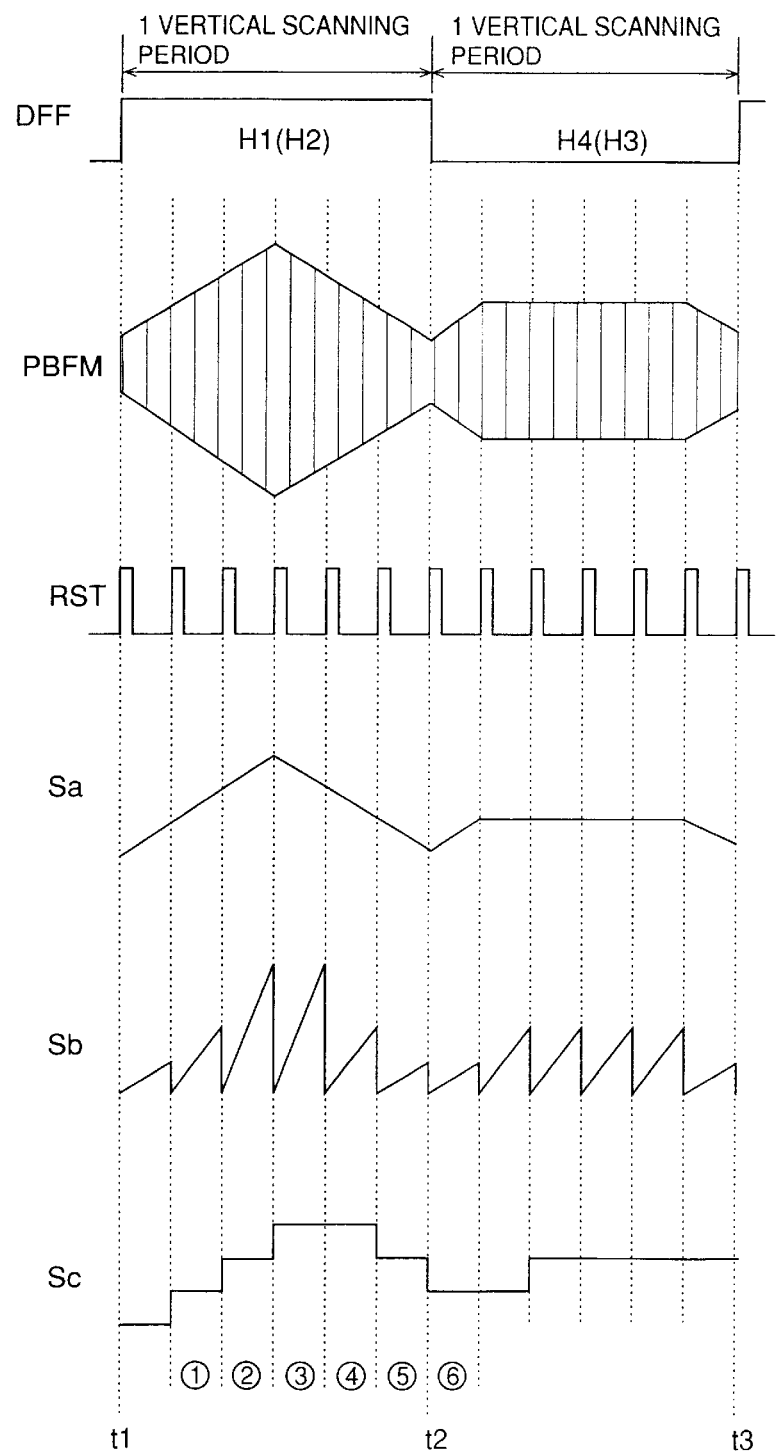

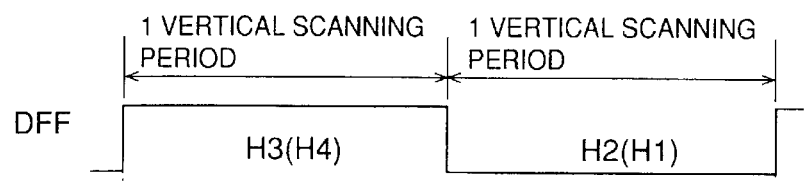
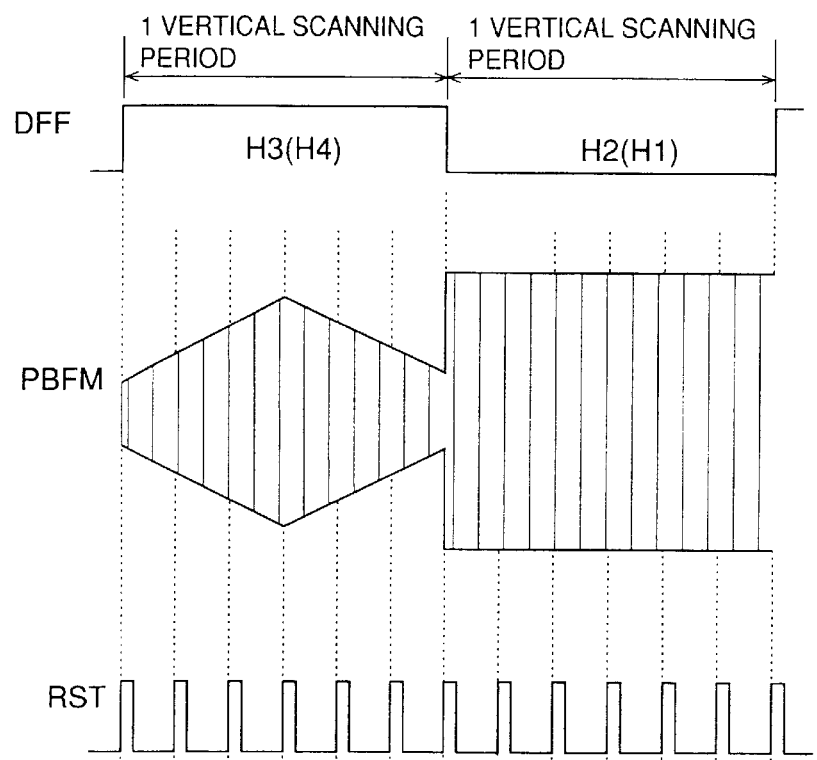
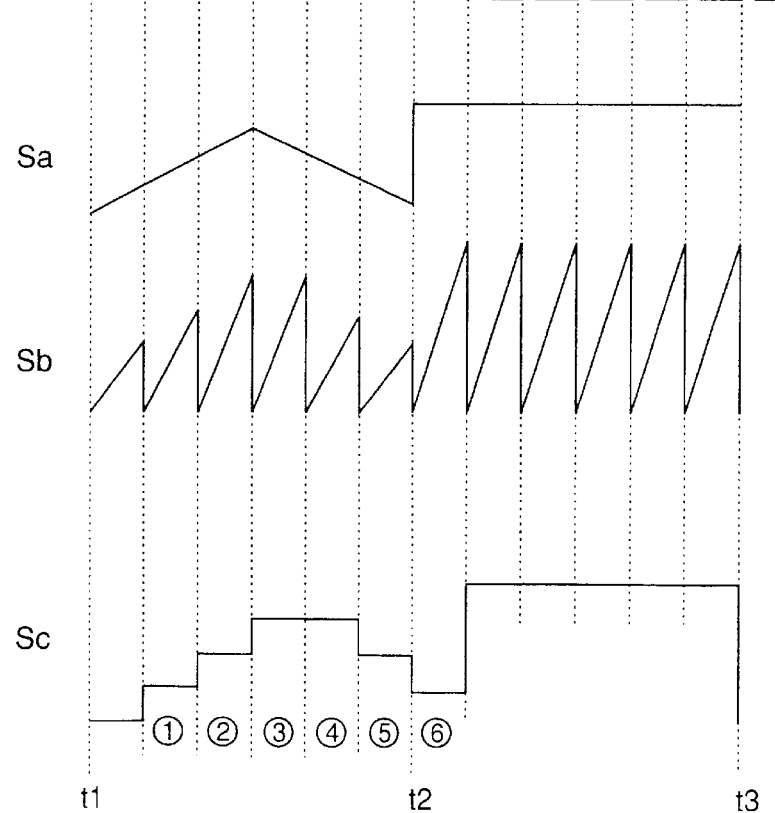

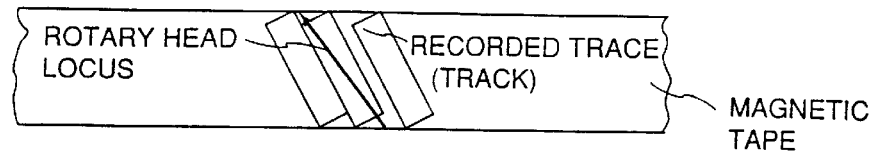
FIG.16
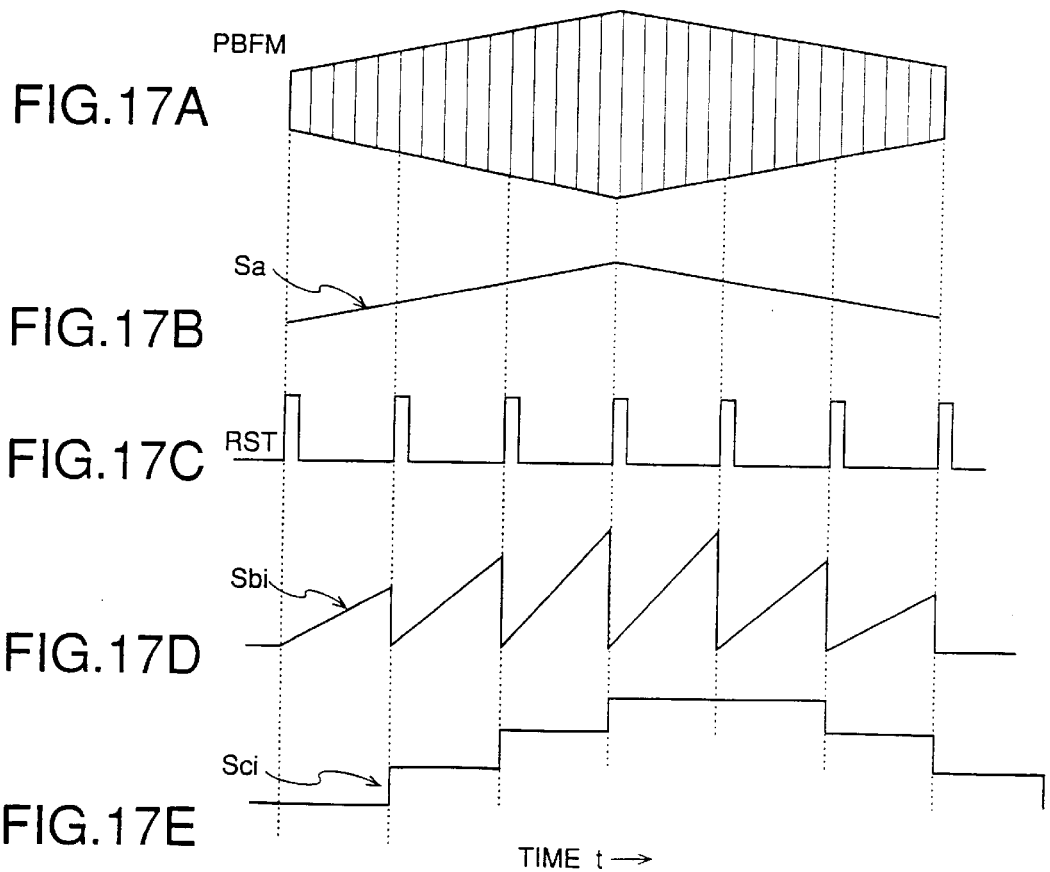

FIG.18
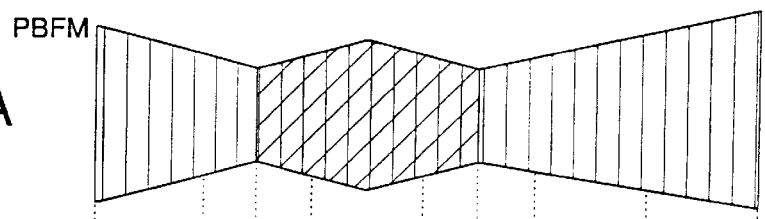
FIG.19A
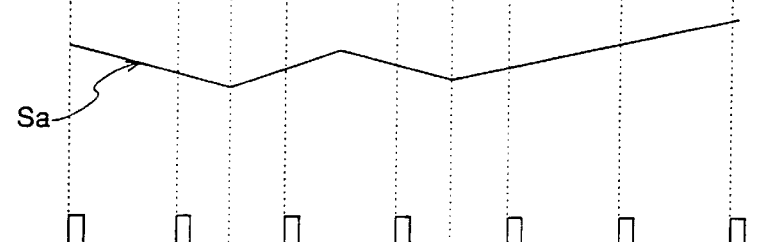
FIG.19B
FIG.19C
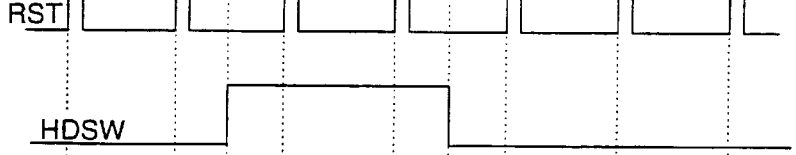
FIG.19D
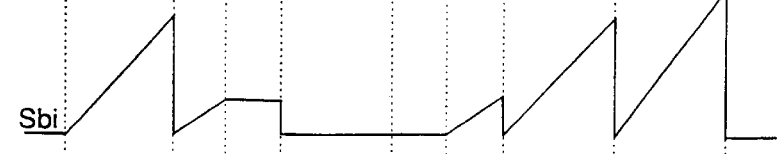
FIG.19E
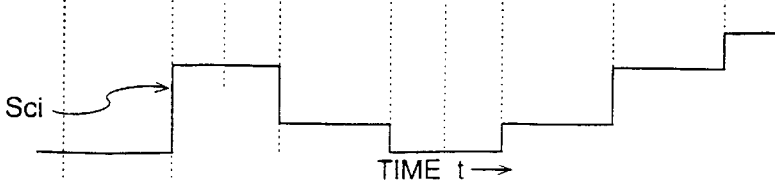
FIG.19F

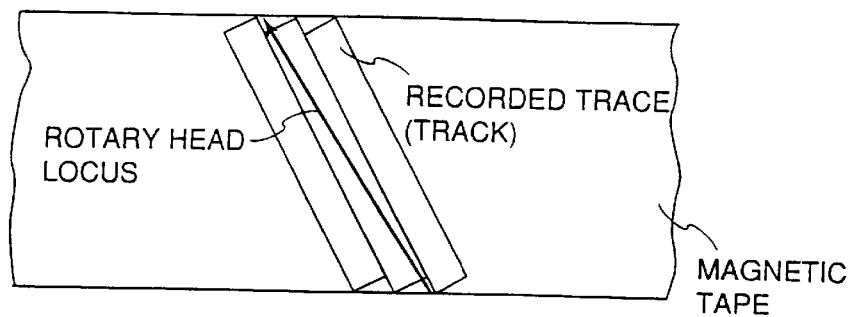
FIG.26
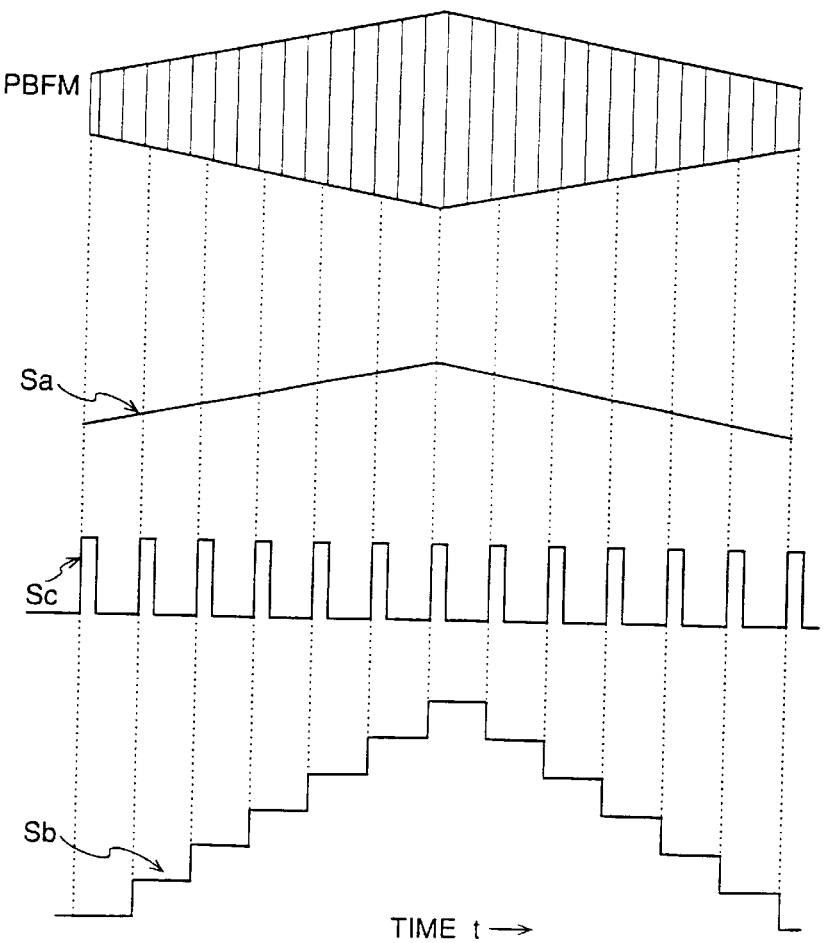
FIG.27A
FIG.27B
FIG.27C
FIG.27D

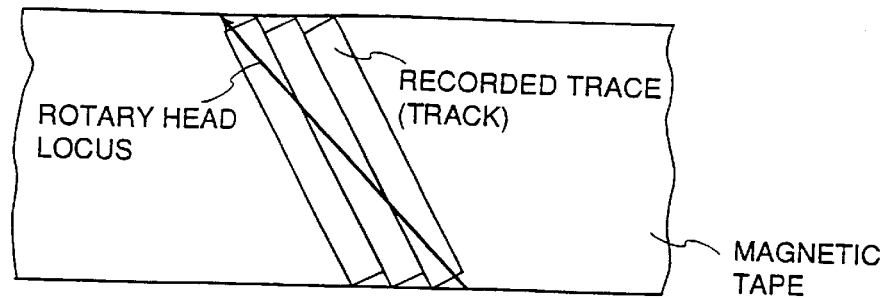
FIG.28
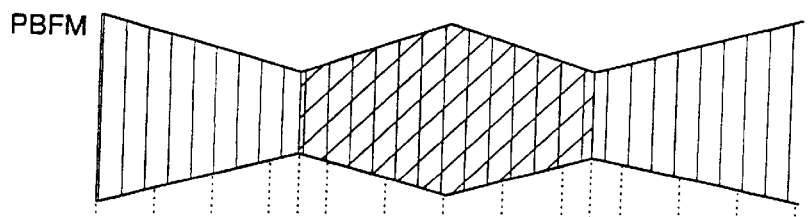
FIG.29A
FIG.29B
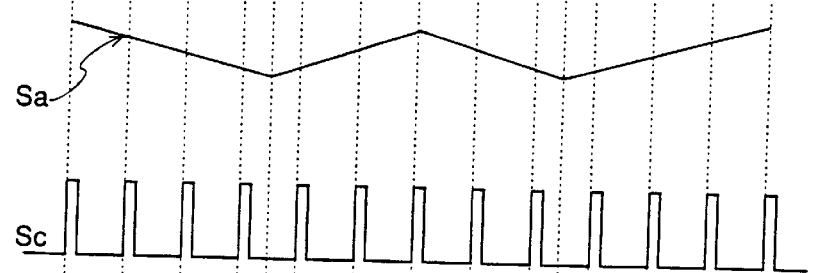
FIG.29C
FIG.29D
FIG.29E
FIG.29F
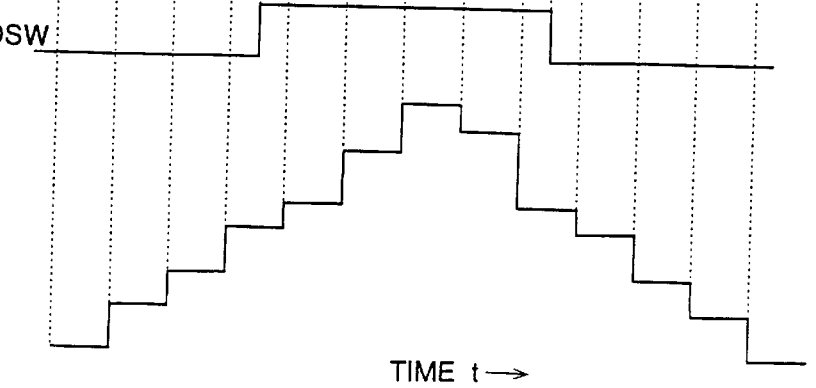
TIME t →

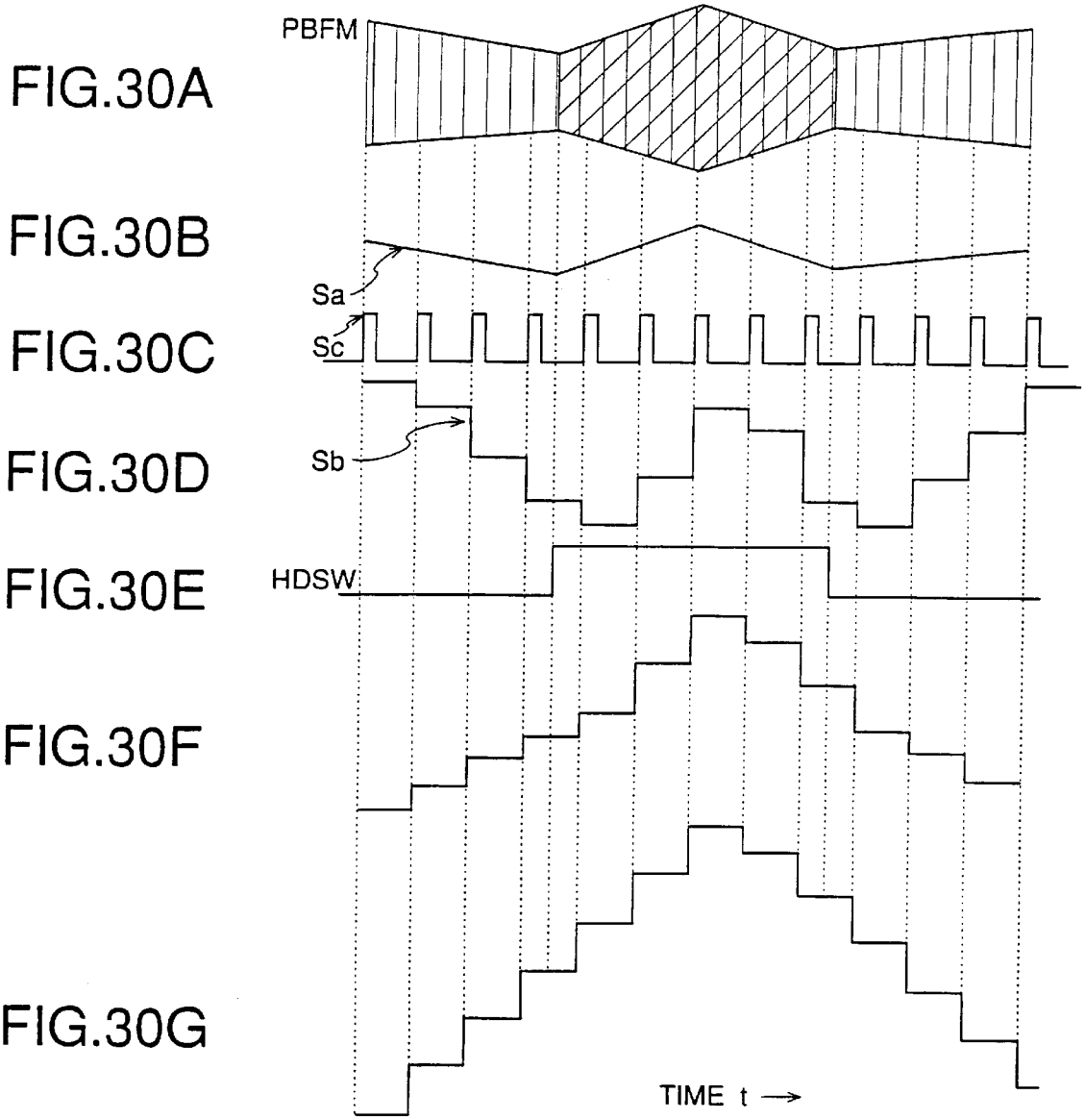
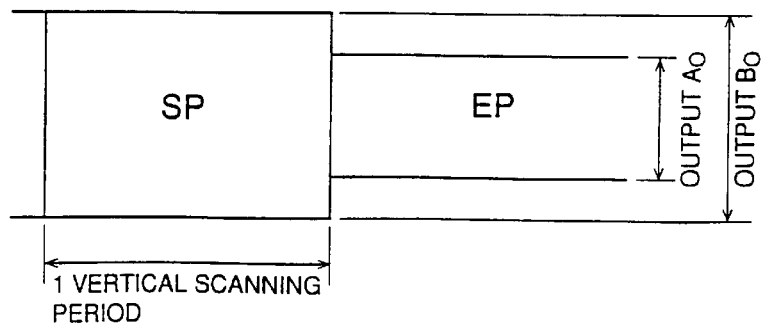
FIG. 31

TRACKING ERROR DATA DETECTING APPARATUS AND VTR HAVING THE SAME APPARATUS

BACKGROUND OF THE INVENTION

The present invention relates to a tracking error data detecting apparatus for a VTR (video tape recorder) and a VTR provided with the same tracking error data detecting apparatus. More specifically, the present invention relates to a tracking error data detecting apparatus which can selectively use excellent signals of less tracking error reproduced by magnetic heads arranged adjacent to each other and having different azimuth angles.

There exists such a VTR that a magnetic tape wound around a part of the circumferential surface of a drum having an upper drum and a lower drum is moved at a predetermined travel speed in order to record and reproduce data in and from the tape by use of two rotary magnetic heads. In the VTR of this type, to attain a high density recording, data are recorded in and reproduced from recorded traces (tracks) arranged adjacent to each other in sequence on the magnetic tape by use of the two rotary magnetic heads having two different azimuth angles.

In more detail, in the above-mentioned VTR, the rotary drum is provided with a pair of rotary magnetic heads having the same track width and two opposite azimuth angles and arranged at two 180-degree symmetrically opposite positions of the rotary drum. The rotary drum is rotated at a predetermined rotational speed. Further, the magnetic tape wound obliquely on at least a part of the circumferential surface of the rotary drum is moved at a predetermined travel speed V under such a condition that the reference edge of the magnetic tape is guided by a guide portion formed in the rotary drum.

Therefore, when the magnetic tape is helically scanned in sequence by a pair of the rotary magnetic heads alternately, recorded traces of video signals to be recorded during one field period can be formed on the magnetic tape being adjacent to each other in sequence in correspondence to each 180-degree rotation of each of a pair of the rotary magnetic heads. Further, in the same way as above, data recorded in the recorded traces can be reproduced from the magnetic tape along the recorded traces.

On the other hand, a VTR of another helical scanning type is so far widely used, such that data can be recorded and reproduced in and from a magnetic tape having a certain memory capacity in two different recording or reproduction periods. In more detail, in the VTR of this type, the track widths selectively determined between two lengths L1 and L2 (L1>L2) are determined as belonging to a first track width group, and track widths selectively determined between two lengths L3 and L4 (L2>L3; L3>L4) are determined as belonging to a second track width group. Further, a first rotary magnetic head having a first magnetic gap G1 formed by the track width belonging to the first track width group and a first predetermined azimuth angle and a second rotary magnetic head having a second magnetic gap G2 formed by the track width belonging to the first track width group and a second predetermined azimuth angle (different from the first azimuth angle) are arranged at two 180-degree symmetrically opposite positions on the circumferential surface of the rotary drum. Further, a third rotary magnetic head having a third magnetic gap G3 formed by the track width belonging to the second track width group and the second azimuth angle is arranged in the vicinity of the first rotary magnetic head. Further, a fourth rotary magnetic head having a fourth magnetic gap G4 formed by the track width belonging to the second track width group and the first azimuth angle is arranged at a 180-degree symmetrically opposite position relative to the third rotary magnetic head on the circumferential surface of the rotary drum. In the arrangement of the four rotary magnetic heads, data can be recorded and reproduced in and from the magnetic tape at two predetermined different travel speeds.

In the above-mentioned VTR, when data are recorded and reproduced in and from the magnetic tape by use of the first and second rotary magnetic heads arranged at two 180-degree symmetrically opposite positions of the rotary drum 180, the magnetic tape is moved at a first specific travel speed. On the other hand, when data are recorded and reproduced in and from the magnetic tape by use of the third and fourth rotary magnetic heads arranged at two 180-degree symmetrically opposite positions of the rotary drum 180, the magnetic tape is moved at a second specific travel speed lower than the first travel speed. On the basis of the above-mentioned operation, recorded traces of video signals during one field period can be formed on the magnetic tape being arranged adjacent to each other in sequence in correspondence to each 180-degree rotation of each of a pair of the rotary magnetic heads. Further, in the same way as above, the recorded data can be reproduced from the magnetic tape along the recorded traces.

By the way, the pattern of the recorded traces formed on the magnetic tape by the above-mentioned two rotary magnetic heads can be decided on the basis of the relative linear speed between the rotary magnetic heads and the magnetic tape and the angle between rotary locus surface of the rotary magnetic heads and the reference edge of the magnetic tape. Further, in use of the above-mentioned VTR, in addition to the normal data reproduction such that recorded data are reproduced at the tape travel speed the same as when data are recorded, trick plays are often effected such that data are reproduced after the magnetic tape has been stopped or such that recorded data are reproduced at the tape travel speed and in the tape travel direction both different from when data are recorded. In the trick play reproduction operation, it has been well known that the rotary locus of the rotary magnetic head depends on the travel speed of the magnetic tape.

In other words, the rotary locus of the rotary magnetic head formed on the magnetic tape by the rotary magnetic head in the normal recording operation crosses the rotary locus of the rotary magnetic head formed on the magnetic tape by the rotary magnetic head in the trick play operation, for instance as shown in FIG. 1. In FIG. 1, the recorded track shown by a solid line frame corresponds to a rotary locus of the rotary magnetic head formed on the magnetic tape in the normal recording operation; the recorded track shown by a dot line frame corresponds to the rotary locus of the rotary magnetic head formed on the magnetic tape in the trick play operation; and a hatched area indicates an area from which video signals can be reproduced by the rotary magnetic head having the same azimuth angle as that of the rotary magnetic head used to form the recorded traces on the magnetic tape.

As described above, in the trick play operation, since the rotary locus of the rotary magnetic head crosses the recorded trace, the signal level of the frequency modulated signal reproduced by the rotary magnetic head changes markedly whenever the rotary magnetic head crosses the recorded trace. That is, when the locus of the rotary head is inclined with respect to the recorded traces formed on the magnetic tape as shown in FIG. 2 for instance, an envelope of the frequency modulated signal reproduced during one vertical scanning period changes largely as shown by a PBFM wave-form in FIG. 3A, with the result that S/N (signal/ noise) ratio of the reproduced picture is degraded in the trick play operation and thereby the quality of the reproduced picture deteriorates. In this case, when S/N ratio is further reduced, noise bars appear in the reproduced picture.

Therefore, in order to prevent noise bars from appearing in the reproduced picture even in the reproduction operation such that the travel speed of the magnetic tape in the reproduction operation is different from that in the recording operation, the following methods have been so far adopted for the VTR: [1] the recorded traces formed on the magnetic tape are traced by use of a rotary magnetic head having an azimuth angle the same as that of the magnetic head used to form the recorded traces, and [2] when two reproduced frequency modulated signals are obtained in such a state that the rotary locus of the two rotary magnetic heads (double-azimuth heads) arranged adjacent to each other and having two different azimuth angles crosses the recorded traces formed on the magnetic tape, one having a high signal level of the two reproduced signals is selected as the reproduced signal.

As the first practical examples of the above-mentioned conventional method [1], Japanese Laid-Open Patent No. 5(1993)-110973 discloses such a VTR that a rotary magnetic head is moved by an actuator (e.g., an electrodynamic type, piezoelectric type, an electromagnetic type, etc.) provided in an automatic tracking control system to trace recorded traces.

As the second practical example of the method [1], Japanese Laid-Open Patent No. 6(1994)-162456 discloses such a VTR that the inclination angle of a drum is changed according to the travel speed of a magnetic tape so that the travel direction of the magnetic tape can be changed relative to the rotary locus surface direction of a rotary magnetic head to trace recorded traces.

As the third practical example of the method [1], Japanese Laid-Open Patent No. 5(1993)-225128 discloses such a VTR that heights of magnetic tape guide rollers arranged on both the inlet and outlet sides of a drum are changed according to the travel speed of a magnetic tape so that the travel direction of the magnetic tape is changed relative to the rotary locus surface direction of a rotary magnetic head to trace recorded traces.

As the fourth practical example of the method [1], Japanese Laid-Open Patent Nos. 5(1993)-75252 and 5(1993)-93593 disclose such a VTR, respectively that an inclination angle of a drum is changed according to the travel speed of a magnetic tape and in addition heights of magnetic tape guide rollers arranged on both the inlet and outlet sides of the drum are changed according to the travel speed of the magnetic tape so that the travel direction of the magnetic tape is changed relative to the rotary locus surface direction of a rotary magnetic head to trace recorded.

Now, in the various trick play operations of popular VTRs, as already described, data are reproduced at a magnetic tape travel speed different from that in the recording operation. In the conventional VTRs, however, the above-mentioned second method [2] has been so far adopted from the standpoint of the cost. That is, when two reproduced frequency modulated signals are obtained in such a state that the rotary locus of two rotary magnetic heads (double-azimuth heads) arranged adjacent to each other and having two different azimuth angles crosses the recorded traces formed on a magnetic tape, one having a high signal level of the two reproduced signals is selected as the reproduced signal. In this second method [2], in general it is possible to improve the picture quality in various trick play operations at a relatively low cost.

In the recent popular VTRs, however, a higher quality has been required for the reproduced picture even in various trick play operation, with the result that the above-mentioned first methods [1] have been adopted more and more for the popular VTRs. Therefore, the applicant has already proposed the first method [1] in order to progress the practical research and development of the VTRs. Japanese Laid-Open Patent Nos. 6(1994)-208701, 6(1994)-318351, and 6(1994)-23406 disclose such a VTR, respectively that an inclination angle of a drum or the reference edge route of a magnetic tape is changed according to the travel speed of the magnetic tape so that the travel direction of the magnetic tape can be changed relative to the rotary locus surface direction of a rotary magnetic head to follow the recorded traces.

Here, the rotary magnetic head can follow the recorded traces by changing the inclination angle of the drum or the reference edge route of the magnetic tape according to the travel speed of the magnetic tape so that the travel direction of the magnetic tape can be changed relative to the rotary locus surface direction of the rotary magnetic head. However, it is necessary to detect an offset (dislocation) value between the rotary locus of the rotary magnetic head and the recorded traces formed on the magnetic tape and further to automatically control the inclination state of the drum or the position of the reference edge route of the magnetic tape so that the offset value can be reduced down to zero. Here, the offset value between the rotary locus of the rotary magnetic head and the recorded traces formed on the magnetic tape can be detected by detecting the reproduced signal level of frequency modulated signal form obtained by the rotary magnetic head.

However, in the popular VTRs, one (having a high signal level) of the two reproduced frequency modulated signals is selected that are obtained by the two rotary magnetic heads arranged adjacent to each other and having two different azimuth angles in the trick play operation. Therefore, it is impossible to take out each of the two frequency modulated signals reproduced by the two rotary magnetic heads, separately.

In addition, the reproduced frequency modulated signal level is relatively high even when the two rotary magnetic heads are in an off-track state. It is thus impossible to obtain tracking error data by detecting the reproduced frequency modulated signal level.

Accordingly, it is impossible to take out the reproduced frequency modulated signals reproduced by the rotary magnetic heads, separately which indicate the offset data between the rotary locus of the rotary magnetic head and the recorded traces formed on the magnetic tape, respectively from the popular VTR.

Therefore, adoption of the various practical examples of the method [1] as already proposed for the popular VTR cannot improve the quality of the picture reproduced in various trick play operation.

Here, the VTR constructed as follows will be taken into account: the travel direction of a magnetic tape and the surface direction of the rotary locus of a rotary magnetic head are changed relative to each other, by changing the inclination angle of the drum or the path of the reference edge of the magnetic tape according to the travel speed of the magnetic tape in such a way that the rotary magnetic head can follow the recorded traces (tracks); the recording operation is effected in combination with the first and second rotary magnetic heads arranged on two 180-degree symmetrically opposite positions of the rotary drum or in combination with the third and fourth rotary magnetic heads; and further the reproduction operation is effected in combination with the first and fourth rotary magnetic heads arranged on two 180-degree symmetrically opposite positions of the rotary drum or in combination with the second and third rotary magnetic heads.

In the VTR as described above, the recording operation and reproduction operation are both effected at various predetermined specific travel speeds of the magnetic tape in such a way that data are recorded as the sequential recorded traces arranged adjacent to each other in sequence on the magnetic tape during one field period of the video signal to be recorded in correspondence to each 180-degree rotation of each of a pair of the rotary magnetic heads and further data are reproduced from the recorded traces. In this case, the rotary locus of the rotary magnetic head is slightly offset from the inclination angle of the recorded traces in the reproduction operation. And, the signal level of the reproduced frequency modulated signal PBFM obtained by the two rotary magnetic heads formed by two different magnetic gaps with two different track widths, respectively for each sequential recorded trace changes in the reproduction operation, as shown in FIGS. 4B, 5B, 6B and 7B.

In other words, FIGS. 4B, 5B, 6B and 7B show the reproduced signal PBFM of frequency modulated signal form (referred to as reproduced FM signal PBFM, hereinafter), obtained when a rotary drum Du as shown in FIG. 8 is used.

FIG. 8 shows the following arrangement:

The first rotary magnetic head H1 formed by a magnetic air gap G1 with a track width T1 (a predetermined width T1 in a range between L1 and L2) belonging to the first track width group and a first predetermined azimuth angle +α, and the second magnetic head H2 formed by a magnetic air gap G2 with a track width T2 (a predetermined width T2 (T2<T1) in a range between L1 and L2) belonging to the first track width group and a second predetermined azimuth angle −α (different from the first azimuth angle +α) are both arranged at two 180-degree symmetrically opposite positions in a circumferential surface of the rotary drum Du.

The third magnetic head H3 formed by a magnetic air gap G3 with a track width T3 (a predetermined width T3 in a range between L3 and L4) belonging to the second track width group and a second predetermined azimuth angle −α is provided in the vicinity of the first rotary magnetic head H1. And further the fourth magnetic head H4 formed by a magnetic air gap G4 with a track width T4 (a predetermined width T4 in a range between L3 and L4) belonging to the second track width group (in FIG. 8, the track width T4 is determined as being the same as T3 between L3 and L4) and a first predetermined azimuth angle +α is provided at a 180-degree symmetrically opposite position with respect to the third rotary magnetic head H3 in a circumferential surface of the rotary drum Du.

Further, in the VTR provided with the rotary drum Du, the reproduced FM signal PBFM shown in FIGS. 4B, 5B, 6B and 7B are obtained, when data are reproduced by use of a combination of the first and fourth rotary magnetic heads H1 and H4 (or a combination of the second and third rotary magnetic heads H2 and H3). This reproduction proceeds under such a condition that data are recorded by use of the first and second rotary magnetic heads H1 and H2 so as to form two recorded traces arranged adjacent to each other in sequence on a magnetic tape. And, the magnetic tape Tp is kept stopped. Or the magnetic tape Tp is driven at a travel speed 2n-times (n: a natural number) higher than the recording speed, so that the longitudinal direction of the recorded traces tr on the recorded magnetic tape Tp is slightly offset from the rotary locus of the first and fourth rotary magnetic heads H1 and H4 (or the second and third rotary magnetic heads H2 and H3) used for reproduction, as shown in FIG. 9A.

Here, in FIGS. 9A and 9B, a frame hw shown by dot-dashed lines indicates a rotary locus obtained by the magnetic gap G1 (or G2) having a track width belonging to the first track, and a frame hn shown by dashed lines indicates a rotary locus obtained by the magnetic gap G4 (or G3) having a track width belonging to the second track. In FIGS. 9A and 9B, it can be well understood that the reproduction signal can be generated by the rotary magnetic head at the area in which the dot-dashed line frame hw or the dashed line frame hn overlaps with the recorded trace tr. Further, in FIGS. 9A and 9B, the area in which the reproduction signal is generated from the recorded trace by use of the rotary magnetic head of the magnetic gap G1 (or G2) having the track width belonging to the first track width is dotted, and the area in which the reproduction signal is generated from the recorded trace by use of the rotary magnetic head of the magnetic gap G3 (or G4) having the track width belonging to the first second width is hatched.

Further, in the VTR provided with the above-mentioned rotary drum Du, FIGS. 5B and 7B show the reproduced FM signal PBFM, obtained when data are reproduced by use of a combination of the second and third rotary magnetic heads H2 and H3 (or a combination of the first and fourth rotary magnetic heads H1 and H4). This reproduction proceeds under such a condition that data are recorded by use of the third and fourth rotary magnetic heads H3 and H4 so as to form the sequential recorded traces arranged adjacent to each other on the magnetic tape. And, the magnetic tape Tp is kept stopped. Or the magnetic tape Tp is driven at a travel speed 2n-times (n: a natural number) higher than the recording speed, so that the longitudinal direction of the recorded traces tr on the recorded magnetic tape Tp is slightly offset from the rotary locus of the second and third rotary magnetic heads H2 and H3 (or the first and fourth rotary magnetic heads H1 and H4) used for reproduction, as shown in FIG. 9B.

Further, in FIGS. 4B (6B) and 5B (7B), the period between time t1 and time t2 and the period between time t2 and the time t3 correspond to one vertical scanning period, respectively. Further, FIG. 4B (6B) show the reproduced FM signal PBFM obtained during one vertical scanning period between t1 and t2. The FM signal PBFM is obtained when the recorded traces tr recorded by the first rotary magnetic head H1 (or the second rotary magnetic head H2) having the track width T1 (or T2) belonging to the first track width group are traced by the same first rotary magnetic head H1 (or the second rotary magnetic head H2).

Further, FIG. 4B (6B) show the reproduced FM signal PBFM obtained during one vertical scanning period between t2 and t3. The FM signal PBFM is obtained when the recorded traces tr recorded by the first rotary magnetic head H1 (or the second rotary magnetic head H2) having the track width T1 (or T2) belonging to the first track width group are traced by the fourth rotary magnetic head H4 (or the third rotary magnetic head H3) having the track width T4 (or T3) belonging to the second track width group.

Further, as understood by the envelope of the reproduced FM signal PBFM shown in FIG. 4B (6B), the level of the reproduced FM signal PBFM obtained during one vertical scanning period between t1 and t2 changes according to the offset value of the inclination angle between the recorded traces tr and the rotary locus surface of the first rotary magnetic head H1 (or the second rotary magnetic head H2) used in the reproduction operation as shown in FIG. 9A. This change happens when the recorded traces tr recorded by the first rotary magnetic head H1 (or the second rotary magnetic head H2) having the track width T1 (or T2) belonging to the first track width group in the recording operation are traced by the first rotary magnetic head H1 (or the second rotary magnetic head H2) in the reproduction operation.

On the other hand, as understood by the envelope of the reproduced FM signal PBFM shown in FIGS. 4B and 6B, the level of the reproduced FM signal PBFM obtained during one vertical scanning period between t2 and t3 does not change even if there exists the offset value of the inclination angle between the recorded traces tr and the rotary locus surface of the fourth rotary magnetic head H4 (or the third rotary magnetic head H3) used in the reproduction operation as shown in FIG. 9A. The level steadiness happens when the recorded traces tr recorded by the first rotary magnetic head H1 (or the second rotary magnetic head H2) having the track width T1 (or T2) belonging to the first track width group in the recording operation are traced by the fourth rotary magnetic head H4 (or the third rotary magnetic head H3) having the track width T4 (or T3) belonging to the second track width (which is narrower than the track width T1 or T2) in the reproduction operation.

Accordingly, as explained with reference to FIG. 4B (6B), the recorded traces tr recorded by the first rotary magnetic head H1 (or the second rotary magnetic head H2) having the track width T1 (or T2) belonging to the first track width group in the recording operation are traced alternately in sequence by the first rotary magnetic head H1 (or the second rotary magnetic head H2) and the fourth rotary magnetic head H4 (or the third rotary magnetic head H3) having the track width T4 (or T3) belonging to the second track width in the reproduction operation. It can be understood that tracking data cannot be obtained from the signal reproduced by the fourth rotary magnetic head H4 (or the third rotary magnetic head H3) during one vertical scanning period.

Further, FIG. 5B (7B) shows the reproduced FM signal PBFM obtained during one vertical scanning period between t1 and t2. The FM signal PBFM is obtained when the recorded traces tr recorded by the third rotary magnetic head H3 (or the fourth rotary magnetic head H4) having the track width T3 (or T4) belonging to the second track width group are traced by the third rotary magnetic head H3 (or the fourth rotary magnetic head H4).

Further, FIG. 5B (7B) shows the reproduced FM signal PBFM obtained during one vertical scanning period between t2 and t3. The FM signal PBFM is obtained when the recorded traces tr recorded by the third rotary magnetic head H3 (or the fourth rotary magnetic head H4) having the track width T3 (or T4) belonging to the second track width group are traced by the second rotary magnetic head H2 (or the first rotary magnetic head H1) having the track width T2 (or T1) belonging to the first track width group.

Further, as understood by the envelope of the reproduced FM signal PBFM shown in FIG. 5B (7B), the level of the reproduced FM signal PBFM obtained during one vertical scanning period between t1 and t2 changes according to the offset value of the inclination angle between the recorded traces tr and the rotary locus surface of the third rotary magnetic head H3 (or the fourth rotary magnetic head H4) used in the reproduction operation as shown in FIG. 9B. The change happens when the recorded traces tr recorded on the magnetic tape by the third rotary magnetic head H3 (or the fourth rotary magnetic head H4) having the track width T3 (or T4) belonging to the second track width group in the recording operation are traced by the third rotary magnetic head H3 (or the fourth rotary magnetic head H4) having the track width T3 (or T4) belonging to the second track width group in the reproduction operation.

However, as understood by the reproduced FM signal PBFM shown in FIG. 5B (7B), the level of the reproduced FM signal PBFM obtained during one vertical scanning period between t2 and t3 does not change, even if there exists the offset value of the inclination angle between the recorded traces tr and the rotary locus surface of the second rotary magnetic head H2 (or the first rotary magnetic head H1) used in the reproduction operation as shown in FIG. 9B. This level steadiness happens when the recorded traces tr recorded on the magnetic tape by the third rotary magnetic head H3 (or the fourth rotary magnetic head H4) having the track width T3 (or T4) belonging to the second track width group in the recording operation are traced by the second rotary magnetic head H2 (or the first rotary magnetic head H1) having the track width T2 (or T1) belonging to the first track width group having a track width between L1 and L2 (which is larger than the track width between L3 and L4 of the second track width group used for the recording operation) in the reproduction operation.

Accordingly, as explained with reference to FIG. 5B (7B), the recorded traces tr recorded on the magnetic tape in sequence by the third rotary magnetic head H3 (or the fourth rotary magnetic head H4) having the track width T3 (or T4) belonging to the second track width group in the recording operation are traced alternately in sequence by the third rotary magnetic head H3 (or the fourth rotary magnetic head H4) and the second rotary magnetic head H2 (or the first rotary magnetic head H1) having the track width T2 (or T1) belonging to the first track width group between L1 and L2 in the reproduction operation. It is understood that tracking data cannot be obtained from the signal reproduced by the second rotary magnetic head H2 (or the first rotary magnetic head H1) having the track width T2 (or T1) belonging to the first track width group (between L1 and L2) during one vertical scanning period.

As described above, the conventional VTR is constructed as follows: the travel direction of the magnetic tape and the rotary locus direction of the rotary magnetic head are changed relative to each other, by changing the inclination angle of the drum or the path of the reference edge of the magnetic tape according to the travel speed of the magnetic tape in such a way that the rotary magnetic head can follow the recorded traces (tracks); the recording operation is effected by use of a combination of the first and second rotary magnetic heads arranged on two 180-degree symmetrically opposite positions of the rotary drum or a combination of the third and fourth rotary magnetic heads both having magnetic gaps of track widths different from those of the magnetic gaps of the first and second rotary magnetic heads, respectively; and the reproduction operation is effected by use of a combination of the first and fourth rotary magnetic heads arranged at two 180-degree symmetrically opposite positions of the rotary drum or a combination of the second and third rotary magnetic heads also arranged on two 180-degree symmetrically opposite positions of the rotary drum.

In this type of VTR, the recording operation and reproduction operation are effected at respective predetermined specific travel speeds of the magnetic tape in such a way that data are recorded as the sequential recorded traces arranged adjacent to each other during one field period of the video signal to be recorded on the magnetic tape by a pair of the above-mentioned rotary magnetic heads in correspondence to for each 180-degree rotation of each of a pair of the rotary magnetic heads and further data are reproduced from the recorded traces.

In this case, the change data of the signal level of the reproduced FM signal obtained via the magnetic gaps having the track widths different from that of the sequential recorded traces obtained in the reproduction operation is not necessarily used as the data indicative of the offset value of the inclination angle between the rotary locus of the rotary magnetic head and the recorded traces formed on the magnetic tape.

SUMMARY OF THE INVENTION

It is an object of the present invention to provide a VTR having a detecting apparatus which can detect data indicative of a correct offset value of the inclination angle between the rotary locus of the rotary magnetic head and the recorded traces formed on the magnetic tape, that is, correct tracking error data.

The present invention provides a video tape recorder, comprising: a drum for winding a magnetic tape therearound; a capstan motor and a drum motor linked with the drum, both motors for traveling the magnetic tape; two rotary magnetic heads arranged adjacent to each other relative to the magnetic tape and having two different azimuth angles; detecting means for receiving one reproduced signal of higher signal level selected from two modulated signals reproduced by the two rotary magnetic heads and for detecting the selected and received signal to output a detected reproduced signal; signal generating means for generating sampling signals each having a signal level corresponding to a signal level of the detected reproduced signal outputted by the detecting means on the basis of the reproduced signal obtained by the selected rotary magnetic head, only during a period while a predetermined one of the two rotary magnetic heads is being selected in response to a head select signal, at each of time intervals obtained by dividing one vertical scanning period into a two or more natural number N; inclination driving means for inclining a central axis of the drum in such a way that the respective signal levels of the sampling signals satisfy a predetermined relative relationship with respect to one another, when recorded signal is reproduced by traveling the magnetic tape at a travel speed different from another travel speed of the magnetic tape in recording operation; and control means for changing rotation phase of the capstan motor relative to a reference drum rotation signal of said drum motor.

This invention further provides a video tape recorder, comprising: a drum for winding a magnetic tape therearound; a capstan motor and a drum motor linked with the drum, both motors for traveling the magnetic tape; two rotary magnetic heads arranged adjacent to each other relative to the magnetic tape and having two different azimuth angles; detecting means for receiving one reproduced signal of higher signal level selected from two modulated signals reproduced by the two rotary magnetic heads and for detecting the selected and received signal to output a detected reproduced signal; first signal generating means for generating sampling signals each having a signal level corresponding to a signal level of the detected reproduced signal, at each of time intervals obtained by dividing one vertical scanning period into a two or more natural number N; second signal generating means for generating a tracking error signal, on the basis of a first sampling signal generated during a period while a predetermined one of the two rotary magnetic heads is being selected in response to a head select signal and a polarity-inverted second sampling signal generated during another period while the remaining other of the rotary magnetic heads is being selected in response to the head select signal; inclination driving means for inclining a central axis of the drum in such a way that the respective signal levels of the sampling signals satisfy a predetermined relative relationship with respect to one another in cooperation with the tracking error signal, when recorded signal is reproduced by traveling the magnetic tape at a travel speed different from another travel speed of the magnetic tape in recording operation; and control means for changing rotation phase of the capstan motor relative to a reference drum rotation signal of the drum motor.

This invention further provides a video tape recorder, comprising: a drum for winding a magnetic tape; a first rotary magnetic head disposed at a predetermined position along a circumference of the drum and having a first azimuth angle; a second rotary magnetic head disposed at a 180-degree symmetrically opposite position relative to the first magnetic tape along the circumference of the drum and having a second azimuth angle different from the first azimuth angle; a third rotary magnetic head disposed adjacent to the first magnetic head along the circumference of the drum and having the second azimuth angle; a fourth rotary magnetic head disposed at a 180-degree symmetrically opposite position relative to the third magnetic tape along the circumference of the drum and having the first azimuth angle; detecting means for detecting reproduced signals obtained by the magnetic heads when the magnetic tape is kept stopped or when the magnetic tape is moved at a travel speed n-times higher than another travel speed of the magnetic tape in recording operation, where n is a natural number, and for outputting the detected reproduced signals; signal generating means for generating sampling signals each having a signal level corresponding to a signal level of each of the detected reproduced signals, at each of time intervals obtained by dividing one vertical scanning period into a two or more natural number N; signal extracting means for extracting one sampling signal from a plurality of the sampling signals as tracking error data, on the basis of the reproduced signal obtained by one magnetic head having a track width close to recorded trace width formed on the magnetic tape, selected from the first to fourth magnetic heads; and inclination driving means for inclining a central axis of the drum according to the tracking error data so that difference in signal level between the sampling signals at each of the time intervals can be determined below a predetermined value.

BRIEF DESCRIPTION OF THE DRAWINGS

FIGS. 3A to 3E are diagrams showing the waveforms of signals processed by a tracking error detecting apparatus for a VTR, which correspond to the relationship shown in FIG. 2;

FIGS. 4A to 4F are diagrams showing the waveforms of signals of the tracking error detecting apparatus for a VTR, in which the rotary locus of the rotary magnetic head is slightly offset away from the inclined and recorded traces formed on the magnetic tape;

FIGS. 6A to 6F are still anther diagrams showing the waveforms of signals of the tracking error detecting apparatus for a VTR, in which the rotary locus of the rotary magnetic head is slightly offset away from the inclined recorded traces formed on the magnetic tape;

FIGS. 7A to 7F are further diagrams showing the waveforms of signals of the tracking error detecting apparatus for a VTR, in which the rotary locus of the rotary magnetic head is slightly offset away from the inclined recorded traces formed on the magnetic tape;

FIG. 16 is a plane view for assistance in explaining the relationship between the recorded traces formed on the magnetic tape and the rotary locus of the rotary magnetic head;

FIGS. 17A to 17E are diagrams showing the waveforms of signals of the tracking error detecting apparatus for a VTR, which corresponds to the relationship shown in FIG. 16;

FIG. 18 is a plane view for assistance in explaining the relationship between the recorded traces formed on the magnetic tape and the rotary locus of the rotary magnetic head;

FIGS. 19A to 19F are diagrams showing the waveforms of signals of the tracking error detecting apparatus for a VTR, which corresponds to the relationship shown in FIG. 18;

FIG. 26 is a plane view for assistance in explaining the relationship between the recorded traces formed on the magnetic tape and the rotary locus of the rotary magnetic head;

FIGS. 27A to 27D are diagrams showing the waveforms of signals of the tracking error detecting apparatus for a VTR, which corresponds to the relationship shown in FIG. 26;

FIG. 28 is a plane view for assistance in explaining the relationship between the recorded traces formed on the magnetic tape and the rotary locus of the rotary magnetic head;

FIGS. 29A to 29F are diagrams showing the waveforms of signals of the tracking error detecting apparatus for a VTR, which corresponds to the relationship shown in FIG. 28;

FIGS. 30A to 30G are diagrams showing the waveforms of signals of the tracking error detecting apparatus for a VTR, in which the track widths of two rotary magnetic heads arranged adjacent to each other and having two different positive and negative azimuth angles, respectively are different from each other;

FIG. 31 is a diagram showing reproduced signals obtained by rotary magnetic heads for standard play having two different track widths, and reproduced signals obtained by the rotary magnetic heads for extended play;

DETAILED DESCRIPTION OF THE PREFERRED EMBODIMENTS

A tracking error data detecting apparatus for a VTR (video tape recorder) which can selectively use excellent signals of less tracking error reproduced by two magnetic heads arranged adjacent to each other and having two different azimuth angles, respectively, and a VTR provided with the tracking error data detecting apparatus according to the present invention will be described in detail hereinbelow with reference to the attached drawings.

Prior to the description of the detecting apparatus and the VTR provided with the detecting apparatus according to the present invention, one example of VTRs for recording and reproducing data in and from a magnetic tape wound around a part of the circumferential surface of a drum by use of two rotary magnetic heads will be described hereinbelow with reference to FIGS. 10A and 10B.

In this VTR, one of the already-explained methods of obtaining the noise-less reproduced signal is embodied in such a way that the direction of the rotary locus surface of the rotary magnetic heads is matched with the recorded traces formed on the magnetic tape in trick play operation (data are reproduced at a magnetic tape speed different from that when recorded). In more detail, in this mechanism example, a central axis of a drum formed with a magnetic tape sliding surface and a travel route of the magnetic tape are both inclined so that the recorded traces formed on the magnetic tape matches the rotary locus surface of the rotary magnetic heads.

Figure 10A:
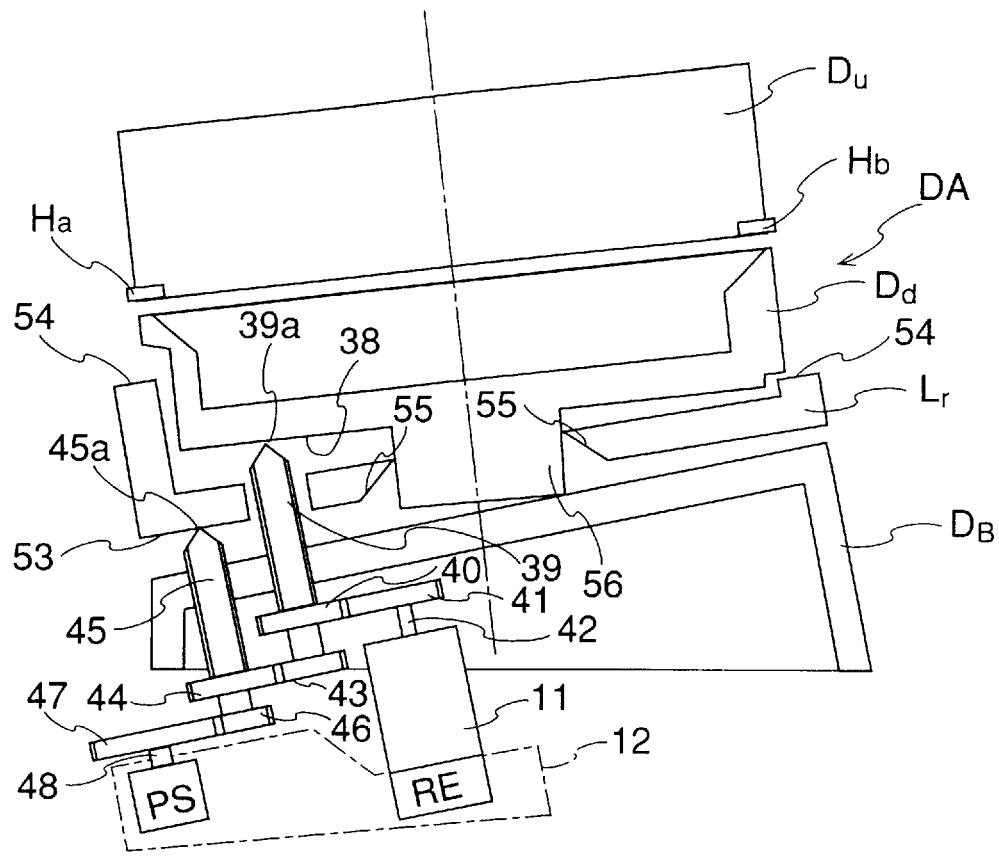
FIG. 10A is a cross-sectional view showing a mechanical part of a VTR.

In FIG. 10A, a drum body DA is provided with an upper drum Du, a lower drum Dd, and a lead ring Lr all arranged concentrically with respect to a central axis of the drum body DA. Further, the drum body DA is mounted on a drum base DB. To facilitate understanding the drum structure, a drum motor, a central shaft of the drum body DA, and an inclination fulcrum disposed in a direction extending from the 90-degree position (the 0-degree position is the leftmost end in FIG. 10A) to the 270-degree position of the drum body DA (a radial direction of the upper drum Du in a plane including the central line and further vertical with respect to the paper in FIG. 10A) are all not shown.

Further, in the case of the drum body DA having such a structure that the upper drum Du is fixed to a rotary shaft of the drum motor, the rotary shaft is located at the central axis of the drum body DA (i.e., the central axes of the upper drum Du, the lower drum Dd, and the lead ring Dr). Further, in the case of the drum body DA having such a structure that the upper drum Du is fixed to a rotor of the drum motor and further the upper drum Du is rotatably supported by a bearing disposed at a shaft fixed to the central position of a stator of the drum motor, the shaft becomes the central shaft of the drum body DA (i.e., the central axes of the upper drum Du, the lower drum Dd, and the lead ring Dr).

Further, in FIG. 10A, two rotary magnetic head sections Ha and Hb are arranged in the outer circumferential direction of the upper drum Du at two symmetrically opposite positions (180 degrees away form each other). The two rotary magnetic head sections Ha and Hb are of a double-azimuth head having two rotary heads arranged adjacent to each other and with two different azimuth angles. Therefore, when the drum motor (not shown) is driven at a predetermined rotational speed, since the upper drum Du is rotated by the drum motor, the two rotary magnetic head sections Ha and Hb fixed to the upper drum Du are both rotated at the same rotational speed of the upper drum Du.

In FIG. 10A, the lower drum Dd is disposed concentrically with respect to the upper drum Du in non-rotatable state. Further, a first inclination rate change screw 39 is engaged with the drum base DB in such a way that an end portion 39a of the screw 39 is in contact with a lower surface 38 of the lower drum Dd. Therefore, when the first inclination rate change screw 39 is moved toward and away from the lower drum Dd, the inclination angle of the drum body DA can be changed with the inclination fulcrum as its center. Here, the inclination fulcrum is located in the direction extending from the 90-degree position to the 180-degree position of the drum body DA (in a radial direction of the upper drum Du in a plane including the central line and further vertical with respect to the paper in FIG. 10A).

Further, two gears 40 and 43 are fixed to the first inclination rate change screw 39. The gear 40 is in mesh with a gear 41 fixed to a rotary shaft 42 of a motor 11. Therefore, the gear 40 can be driven by the motor 11 via the gear 41 and the gear 40. Here, the rotational speed of the motor rotary shaft 42 is reduced by a reduction gear (not shown). Further, the gear 43 is in mesh with a gear 44 fixed to a second inclination rate change screw 45. The first inclination rate change screw 39 and the second inclination rate change screw 45 are both screwed into two threaded holes formed in he drum base DB fixed to a fixed portion of the VTR.

Further, an end portion 45a of the second inclination rate changing screw 45 is in contact with a lower surface 53 of the lead ring Lr. A gear 46 fixed to the second inclination rate change screw 45 is in mesh with a gear 47. The gear 47 is in mesh with a rotary shaft 48 of a reference position detector PS. Here, determined as $\Delta\theta1\approx2\Delta\theta2$ is the relationship between the change rate $\Delta\theta1$ of the inclination angle of the drum due to the axial movement of the first inclination rate change screw 39 caused by a unit rotation rate of the motor 11 and the change rate $\Delta\theta2$ of the inclination angle of the drum due to the axial movement of the second inclination rate change screw 45 caused by a unit rotation rate of the motor 11, where the change direction is the same in both.

Further, as shown in FIG. 10A, when the first and second inclination rate change screws 39 and 45 are coupled with each other by the two gears 43 and 44, a right-handed screw is used for the first inclination rate change screw 39, and a left-handed screw is used for the second inclination rate change screw 45, or vice versa.

Figure 11:
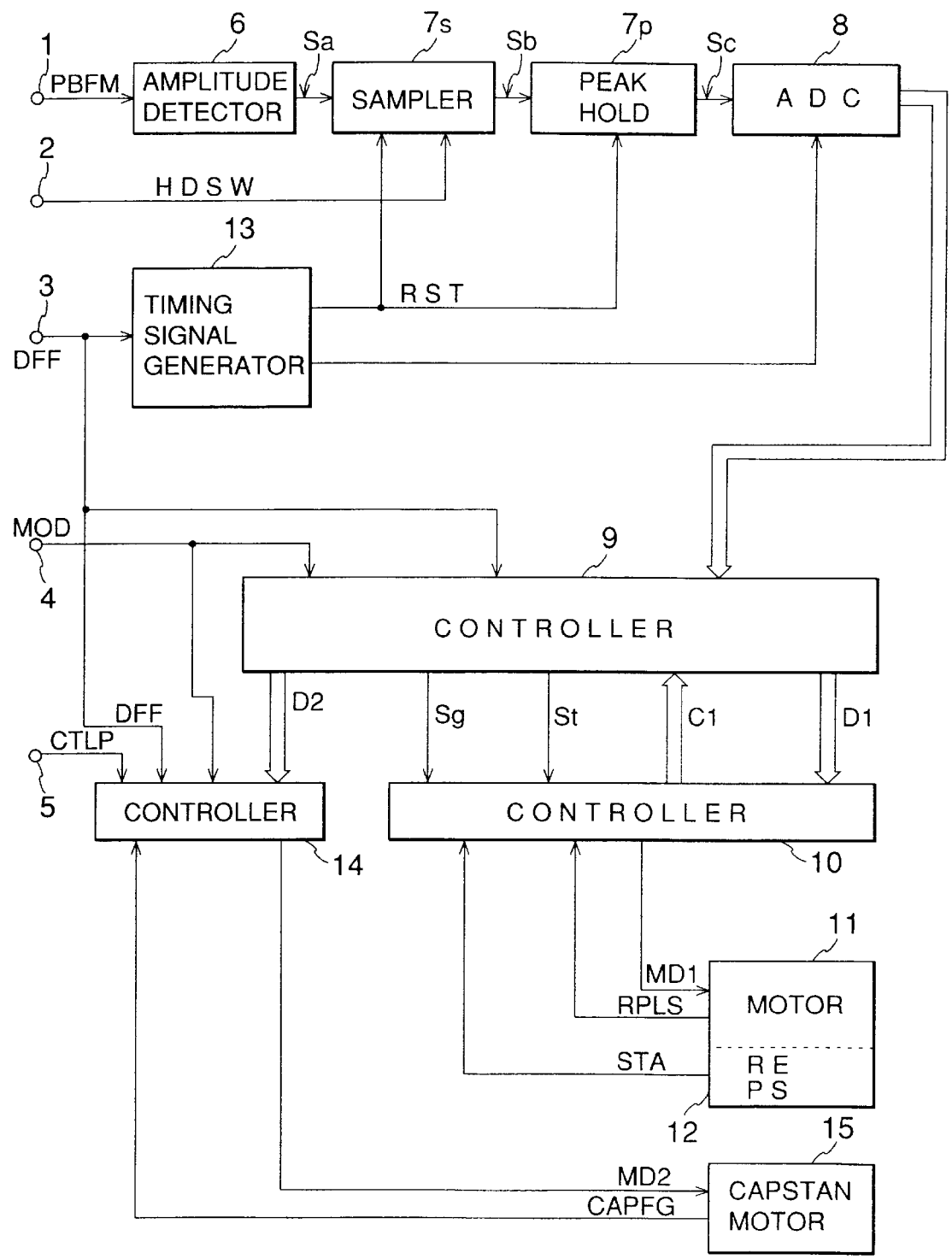
FIG. 11 is a block diagram showing a first preferred embodiment of the tacking error data detecting apparatus according to the present invention.
Figure 12:
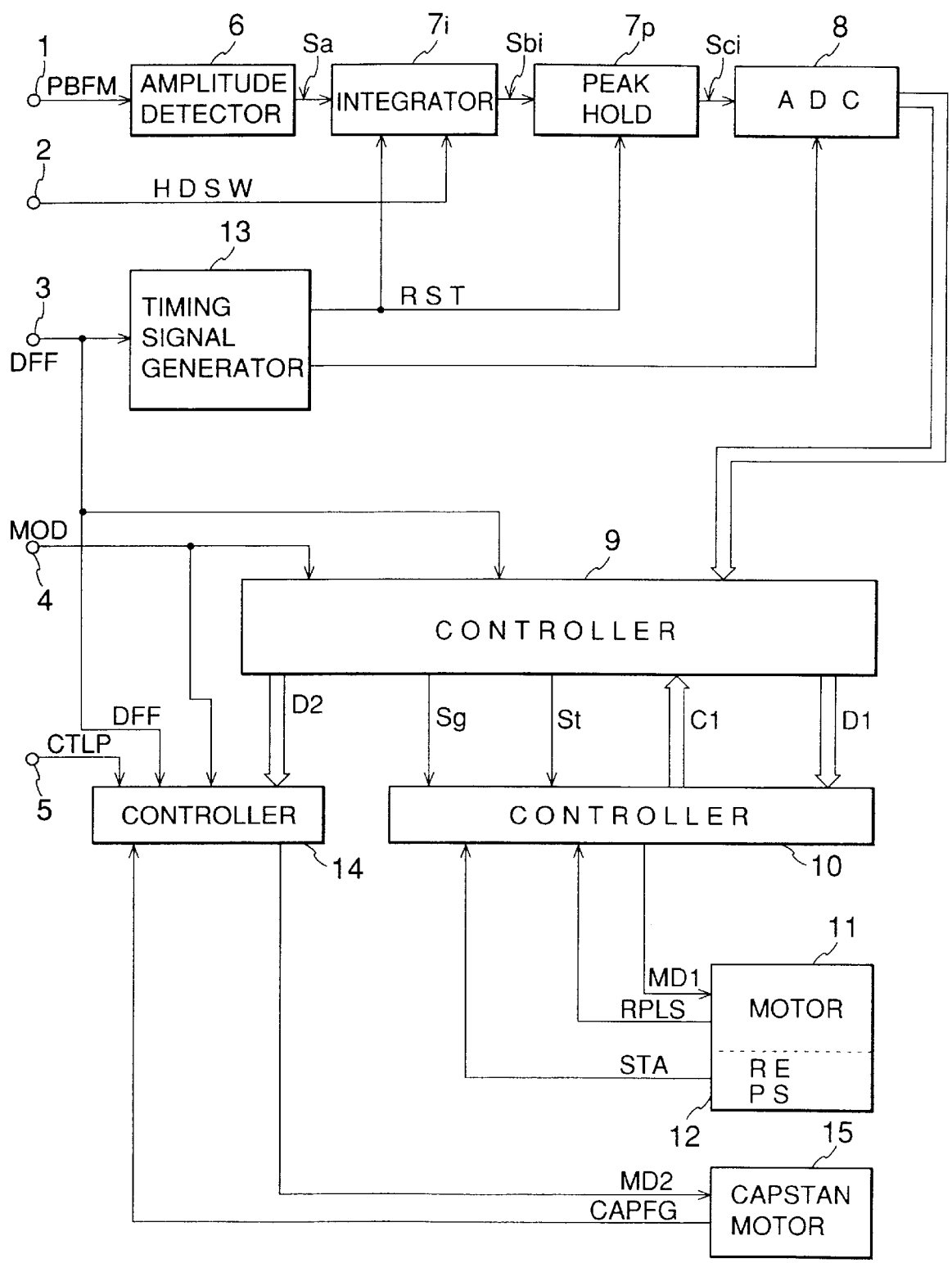
FIG. 12 is a block diagram showing a second preferred embodiment of the tacking error data detecting apparatus according to the present invention.

Further, the motor 11, the rotary encoder RE, the reference position detector PS, etc. shown in FIG. 10A are all the same as the motor 11, the rotary encoder RE, and the reference position detector PS shown in FIGS. 11 and 12, respectively.

The upper outer circumferential edge portion 54 of the lead ring Lr serves as a guide surface for the reference edge of the magnetic tape. Further, the lower inner circumferential end portion 55 of the lead ring Lr is fitted to an outer circumference of a central lower projection portion 56 of the lower drum Dd. Therefore, the lead ring Lr, the upper drum Du and the lower drum Dd can be all coupled with each other concentrically.

When the motor 11 drives the rotary encoder RE and the gear 41 fixed to the rotary shaft 42 of the motor 11, a drive power of the motor 11 is transmitted to the first inclination angle rate change screw 39 by way of the gear 41 and the gear 40; further to the second inclination angle rate change screw 45 by way of the gear 43 and the gear 44; and further to the reference position detector PS by way of the gear 46 and the gear 47, respectively. Therefore, the rotary encoder RE and the reference position detector PS (both shown in FIGS. 11, 12 and 10A, respectively) are driven by the rotational force of the motor 11.

Further, when the first inclination rate change screw 39 is moved through the threaded hole formed in the drum base DB, the upper drum Du and the lower drum Dd are pivoted with the already explained inclination fulcrum (extending from the 90-degree position to the 270-degree position of the drum body DA) as its pivotal center. The central axis of the upper drum Du and the lower drum Dd is thus inclined from its original central axis thereof in the direction extending from the 0-degree position to the 180-degree position of the drum body DA (in the right and left direction on a paper shown in FIGS. 10A and 13).

In the same way, when the second inclination rate change screw 45 is moved through the threaded hole formed in the drum base DB, since the lead ring Lr is pivoted with the same inclination fulcrum as its pivotal center, the central axis of the lead ring Lr is inclined from the original central axis thereof in the direction extending from the 0-degree position to the 180-degree position of the drum body DA.

Figure 13:
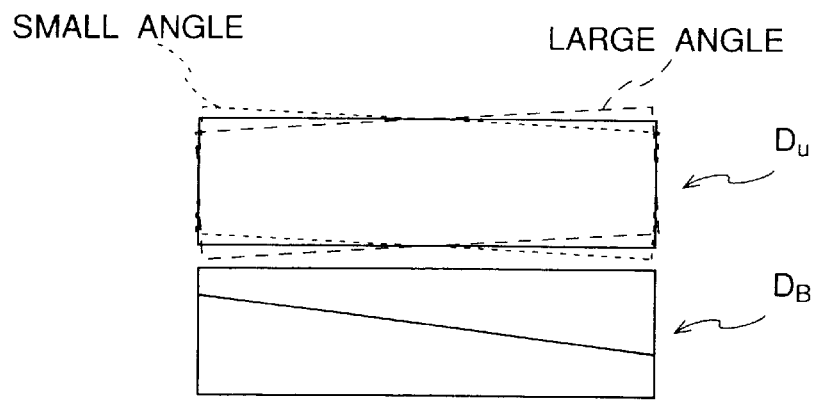
FIG. 13 is a plane view for assistance in explaining the inclination state of a drum.

For instance, in the case where the VTR is operating in the first forward reproduction mode (FF), the upper drum Du is situated at a position as shown by dot lines and indicated by "a small angle" in FIG. 13. In this state, the upper drum Du is inclined the right side down from the position of the upper drum Du situated in the normal reproduction mode as shown by solid lines in FIG. 13. Further, in the case where the VTR is operating in the first backward reproduction mode (FB), the upper drum Du is situated at a position as shown by dashed lines and indicated by "a large angle" in FIG. 13. In this stat, the upper drum Du is inclined the left side down from the position of the upper drum Du in the normal reproduction mode as shown by solid lines in FIG. 13.

Figure 10B:
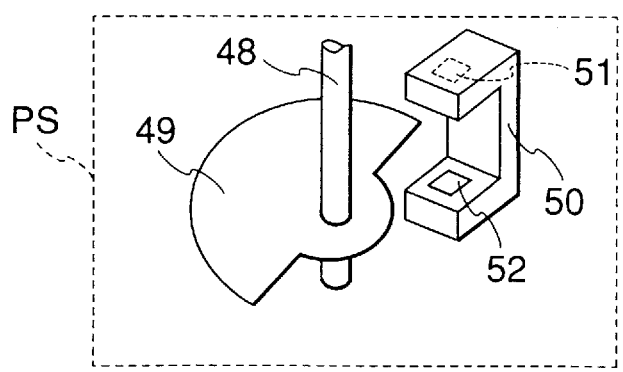
FIG. 10B is a perspective view showing another mechanical part of the VTR.

FIG. 10B shows a practical example of the position sensor PS (included in a section denoted by 12 in FIG. 10A and shown in FIGS. 11 and 12, respectively). The position sensor PS is of photo-interrupter type 50, which is provided with a pair of light emitting element 51 and light receiving element 52 arranged so as to face each other, and a circular arc shaped light shading plate 49 movable through a light path formed between the two elements. Here, the circular arc shaped light shading plate 49 is fixed to the rotary shaft 48 to which the fixed gear 47 is fixed as shown in FIG. 10A. Further, the reference position of the central axis of the drum DA and the reference position of the central axis of the lead ring Lr are both determined, as being a position of the light shading plate 49. The plate position is situated when the light shading plate 49 fixed to the rotary shaft 48 of the position sensor PS is moved away from the light path between the light emitting element 51 and the light receiving element 52 and thereby the light emitted by the light emitting element 51 can be received by the light receiving element 52.

Therefore, it is possible to detect the inclination angle and the inclination direction of the central axis of the drum DA and the inclination angle and the inclination direction of the central axis of the lead ring Lr on the basis of the pivotal rate (or movement rate) of the light shading plate 49 from the reference position of the central axis of the drum DA. Further, the pivotal rate of the circular arc shaped light shading plate 49 can be known on the basis of the number of output pulses of the rotary encoder RE attached to the motor 11.

Accordingly, when the central axes of the drum DA and the lead ring Lr are located at the reference position, respectively, the inclination angles and directions of both the central axes of the drum DA and the lead ring Lr can be detected by counting the number of rotary pulses outputted by the rotary encoder RE by use of a counter (not shown) previously set to a predetermined numerical value by an output signal of the photo-interrupter 50 used as the position sensor PS.

The gist of the present invention will be described hereinbelow with reference to the attached drawings. FIGS. 11 and 12 are two schematic block diagrams showing the essential portions of the first and second embodiments, respectively, of the tracking error data detecting apparatus for a VTR according to the present invention. The feature of the VTR according to the present invention is to selectively use better one of two reproduction signals reproduced by two magnetic heads arranged adjacent to each other and having two different azimuth angles.

In the VTR according to the present invention, the reproduced signal of higher signal level is selected from two reproduced frequency-modulated signals both obtained separately by the two rotary magnetic heads arranged adjacent to each other and having two different azimuth angles.

The selected one of the reproduced FM signal (See signal PBFM shown in FIGS. 3A, 15A, 17A and 19A) is supplied to an input terminal 1, and then detected by an amplitude detector 6. Therefore, an envelope signal Sa of the reproduced FM signal PBFM as shown in FIGS. 3B, 15B, 17B and 19B is outputted by the amplitude detector 6. The detected envelope signal Sa of the reproduced FM signal PBFM outputted by the amplitude detector 6 is supplied to a sampler 7s in the case of the circuit shown in FIG. 11 and to an integrator 7i in the case of the circuit shown in FIG. 12.

Figure 15:
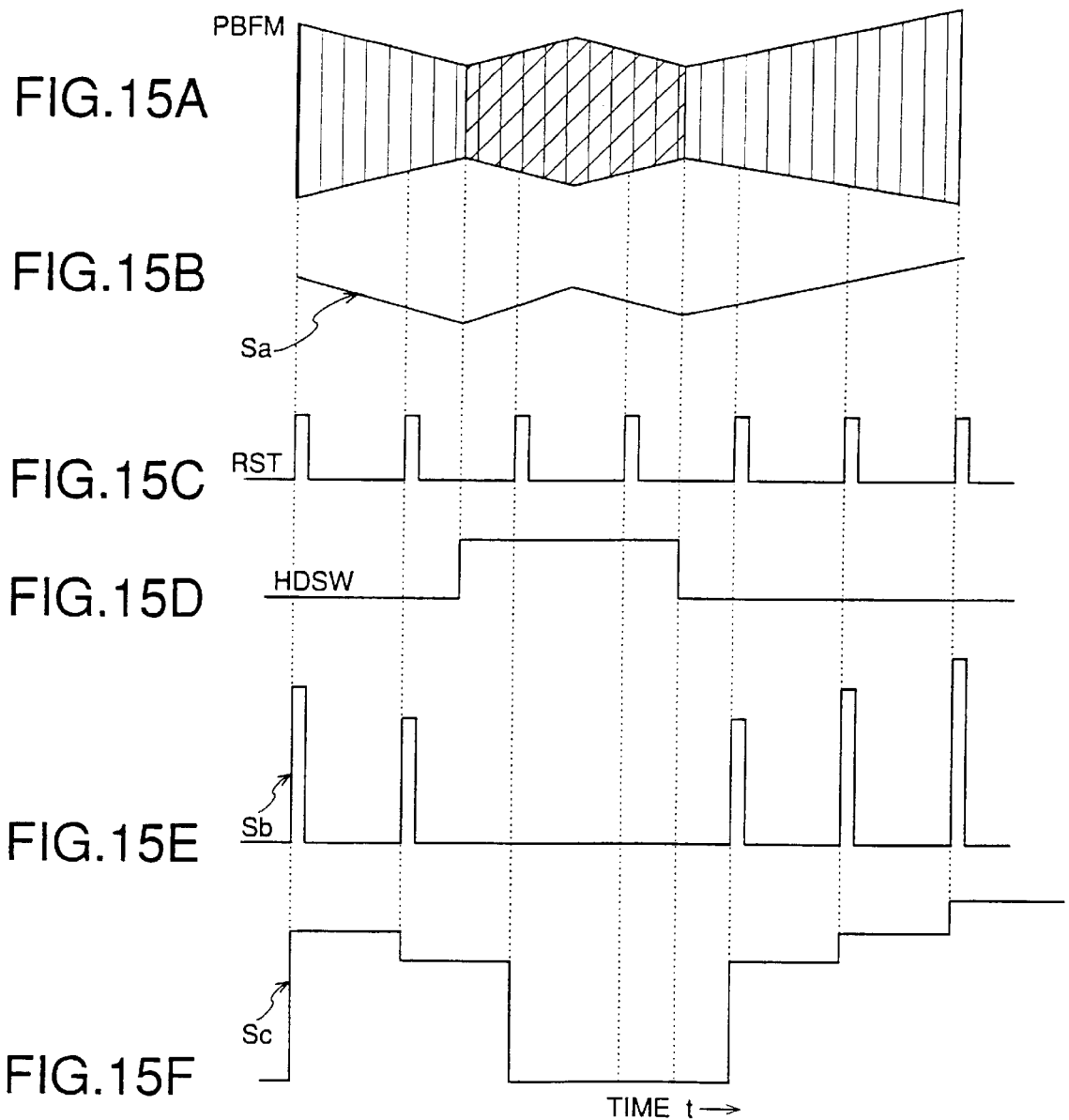
FIGS. 15A to 15F are diagrams showing the waveforms of signals of the tracking error detecting apparatus for a VTR, which corresponds to the relationship shown in FIG. 14.

First, in FIG. 11, the sampler 7s extracts samples of the envelope signal Sa by use of a reset signal RST (as shown in FIGS. 3C and 15C) generated by a timing signal generator 13 as a sampling pulse (a sample extracting signal). The sampled signal Sb extracted from the envelope signal Sa by the sampler 7s at each timing of the reset signal RST is supplied to a peak hold circuit 7p. The peak hold circuit 7b holds each peak value of the sample signal Sb at each timing of the reset signal RST, so that an analog signal Sc as shown in FIGS. 3E and 15F is outputted by the peak hold circuit 7p. The output analog signal Sc is supplied to an analog-digital convertor (ADC) 8.

Figure 2:
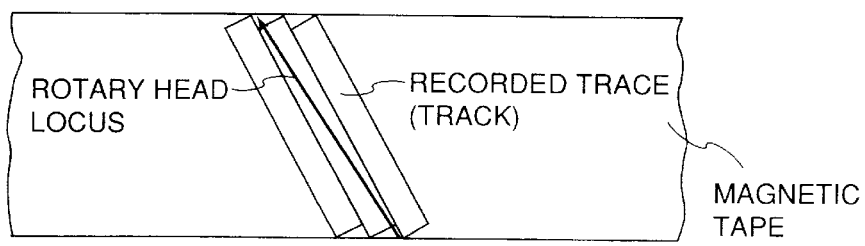
FIG. 2 is another plane view for assistance in explaining the relationship between recorded traces formed on a magnetic tape and the rotary locus of a rotary magnetic head.

FIG. 2 and FIGS. 3A to 3E (or FIG. 16 and FIGS. 17A to 17E related to the block diagram shown in FIG. 12) show a practical example obtained when the reproduced FM signal is generated in such a state that the relationship between the recorded traces (the recorded tracks) formed on the magnetic tape and the movement locus of the rotary magnetic heads in the reproduction operation can be shown in FIG. 2 (or FIG. 16); that is, in such a state that the rotary magnetic heads cross the recorded traces to generate the reproduction signal on condition that the two rotary magnetic heads are not switched on the basis of a head select signal HDSW in the reproduction operation.

Figure 14:
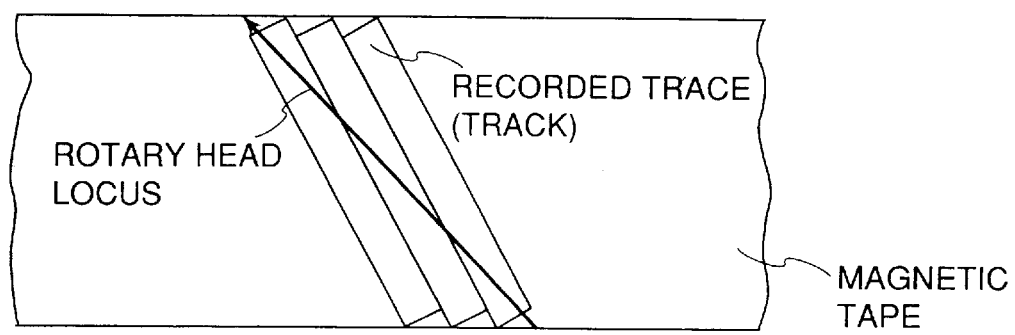
FIG. 14 is a plane view for assistance in explaining the relationship between the recorded traces formed on the magnetic tape and the rotary locus of the rotary magnetic head.

Further, FIG. 14 and FIGS. 15A to 15F (or FIG. 18 and FIGS. 19A to 19E related to the block diagram shown in FIG. 12) shows a practical example obtained when the reproduced FM signal is generated in such a state that the relationship between the recorded traces (the recorded tracks) formed on the magnetic tape and the movement locus of the rotary magnetic heads in the reproduction operation can be shown in FIG. 14 (or FIG. 18); that is, in such a state that the rotary magnetic heads cross a plurality of the recorded traces to generate the reproduction signal on condition that the two rotary magnetic heads are switched on the basis of a head select signal HDSW in the reproduction operation.

Figure 20:
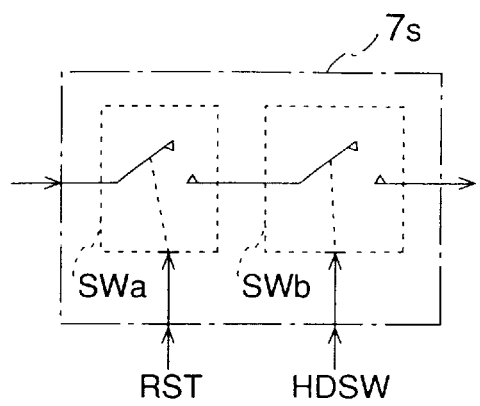
FIG. 20 is a block diagram showing an example of a sampler shown in FIG. 11.

FIG. 20 shows a practical example of the sampler 7s shown in FIG. 11. In FIG. 20, the sampler 7s is provided with a switch SWa turned on during the period when the reset signal RST supplied as the sampling pulse is at a high level and a switch SWb turned off during the period when the select signal HDSW is at a high level.

The sequential sample signal Sb (e.g., as shown in FIG. 3D) outputted by the sampler 7s is supplied to the peak hold circuit 7p, when the switch SWb is turned on (HDSW is low); that is, when the rotary magnetic heads are not switched on the basis of the head select signal HDSW.

Therefore, when the reproduced FM signal PBFM as shown in FIG. 3A is inputted to the input terminal 1 of the circuit shown in FIG. 11, the sequential sample values are held by the peak hold circuit 7p, and then supplied to the analog-digital convertor 8 as the signal Sc shown in FIG. 3E. In this case, the signal Sc is the reproduced signal obtained by any one (previously determined) of the two rotary magnetic heads arranged adjacent to each other and having two different azimuth angles.

Further, when the reproduced FM signal PBFM as shown in FIG. 15A is inputted to the input terminal 1 of the circuit shown in FIG. 11, the amplitude of the reproduced FM signal PBFM is detected by the amplitude detector 6 and outputted as the envelope signal Sa as shown in FIG. 15B. The outputted envelope signal Sa is sampled by the sampler 7s on the basis of the reset signal RST.

In this case, however, as shown in FIG. 15D, the two rotary magnetic heads are switched to any one of the two magnetic heads on the basis of the head select signal HDSW, the sampled signal Sb supplied from the sampler 7s (through the switch SWb shown in FIG. 20) to the peak hold circuit 7p is thus the signal Sb corresponding to the reproduced FM signal PBFM obtained by any one (previously determined) of the two rotary magnetic heads having two different azimuth angles selected by the head select signal HDSW.

Therefore, the signal Sc whose sampled values are held by the peak hold circuit 7p and then supplied to the analog-digital convertor 8, that is, the signal Sc corresponding to the reproduced FM signal PBFM obtained by any one (previously determined) of the two rotary magnetic heads arranged adjacent to each other having two different azimuth angles becomes as shown in FIG. 15F. Here, the circuit as shown in FIG. 12 in which the envelope signal Sa of the reproduced FM signal PBFM outputted by the amplitude detector 6 is supplied to the integrator 7i will be described hereinbelow. In this case, the signal Sbi supplied from the integrator 7i to the analog digital convertor 8 via the peak hold circuit 7p is different between the following first and second cases.

Here, in the first case, the reproduced FM signal PBFM is obtained in such a state that the relationship between the recorded traces (the recorded tracks) formed on the magnetic tape and the movement locus of the rotary magnetic head in the reproduction operation can be shown in FIG. 16; that is, in such a state that the rotary magnetic heads cross the single recorded traces to generate the reproduction signal on condition that the two rotary magnetic heads are not switched on the basis of a head select signal HDSW in the reproduction operation.

Further, in the second case, the reproduced signal is obtained in such a state that the relationship between the recorded traces (the recorded tracks) formed on the magnetic tape and the movement locus of the rotary magnetic head in the reproduction operation can be shown in FIG. 18; that is, in such a state that the rotary magnetic heads cross a plurality of the recorded traces to generate the reproduced signal on condition that the two rotary magnetic heads are switched on the basis of a head select signal HDSW in the reproduction operation.

Figure 21:
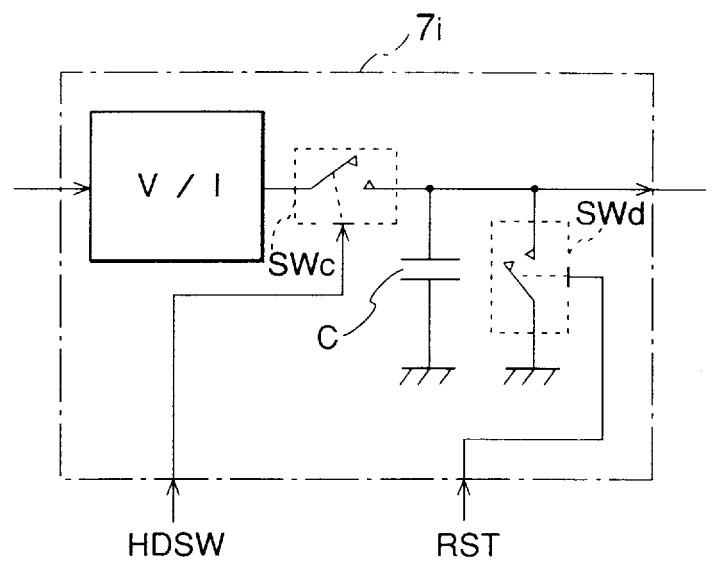
FIG. 21 is a block diagram showing an example of an integrator shown in FIG. 12.

FIG. 21 shows a practical example of the integrator 7i shown in FIG. 12. In FIG. 21, the integrator 7i is provided with a voltage-current convertor V/I, a switch SWc that is turned off during the period when the select signal HDSW is at the high level, a switch SWd that is turned on during the period when the reset signal RST is at the high level, and a capacitor C. In the integrator 7i, when the switch SWc is turned on, the current supplied from the voltage-current convertor V/I is charged into the capacitor C. On the other hand, when the switch SWd is turned on in response to the reset signal RST, the charge (the integrated value) of the capacitor C is discharged or reset.

Therefore, in this integrator 7i, when any one of the two rotary magnetic heads is selected on the basis of the head select signal HDSW for selecting any one (having a higher signal level) of the FM signals reproduced by the two rotary magnetic heads, the integral operation of the detected reproduced FM signal is enabled. On the other hand, when the other remaining one of the two rotary magnetic heads is selected on the basis of the head select signal HDSW, the integral operation of the detected FM reproduced signal is disabled. Further, when the reset signal RST is applied to the switch SWd, the charged signal (the integral value) of the capacitor C can be discharged or reset to zero level. The integral level signal of the capacitor C is outputted from the integrator 7i to the peak hold circuit 7p.

The operation of the integrator 7i obtained when the rotary magnetic heads are not switched on the basis of the head select signal HDSW will be described hereinbelow with reference to FIG. 16 and FIGS. 17A to 17E.

For instance, when the reproduced FM signal PBFM (as shown in FIG. 17A) is inputted to the input terminal 1 of the circuit shown in FIG. 12, the inputted reproduced FM signal is detected by the amplitude detector 6. The envelope signal Sa (as shown in FIG. 17B) of the reproduced FM signal PBFM outputted by the amplitude detector 6 is supplied to the integrator 7i to charge the capacitor C shown in FIG. 21, because the switch SWc is kept turned on in response to the low-level head select signal HDSW. Here, the electric charge stored in the capacitor C becomes an integral value of the envelope signal Sa. The electric charge of the capacitor C is reset by the switch SWd (shown in FIG. 21) that is turned on in response to the reset signal RST (shown in FIG. 17C). Therefore, the envelope signal Sa is integrated by the capacitor C for each time interval between two reset signals RST, and the sequential integral value signal Sbi (as shown in FIG. 17D) is supplied to the peak hold circuit 7p.

As described above, whenever the reproduced FM signal PBFM as shown in FIG. 17A is inputted to the input terminal 1 shown in FIG. 12, the peak value signal Sci of the sequential integral value signal Sbi held by the peak hold circuit 7p for each time interval and then supplied to the analog-digital convertor 8 becomes the signal as shown in FIG. 17E. Here, the signal Sci is the one obtained in correspondence to predetermined one of two reproduced FM signals reproduced by the two rotary magnetic heads arranged adjacent to each other and having two different azimuth angles, respectively.

The operation of the integrator 7i obtained when the rotary magnetic heads are switched on the basis of the head select signal HDSW will be described hereinbelow with reference to FIG. 18 and FIGS. 19A to 19E.

For instance, when the reproduced FM signal PBFM (as shown in FIG. 19A) is inputted to the input terminal 1 of the circuit shown in FIG. 12, the inputted reproduced FM signal PBFM is detected by the amplitude detector 6. The envelope signal Sa (as shown in FIG. 19B) of the reproduced FM signal PBFM outputted by the amplitude detector 6 is supplied to the integrator 7i to charge the capacitor C shown in FIG. 21. The electric charge stored in the capacitor C is an integral value of the envelope signal Sa. The electric charge of the capacitor C is charged or reset by the switch SWd (shown in FIG. 21) that is turned on in response to the reset signal RST (shown in FIG. 19C).

Being different from the operation of when the head select signal HDSW is kept at the low level to turn on the switch SWc, the integrator 7i operates on the basis of the head select signal HDSW in such a way that the integral operation is enabled only the period when the head select signal HDSW is kept at the low level (the switch SWc is kept turned on) but holds the integral value immediately before the head select signal HDSW changes from the low level to the high level until the succeeding reset signal RST is applied to the integrator $7i$, as shown in FIG. 19E. As described above, whenever the reproduced FM signal PBFM as shown in FIG. 19A is inputted to the input terminal 1 shown in FIG. 12, the peak value signal Sci of the sequential integral value signal Sbi held by the peak hold circuit $7p$ for each time interval and then supplied to the analog-digital convertor 8 becomes the signal as shown in FIG. 19F. Here, the signal Sci is the one obtained in correspondence to the predetermined one of two reproduced FM signals reproduced by the two rotary magnetic heads arranged adjacent to each other and having two different azimuth angles, respectively.

The above-mentioned reset signal RST is generated by the timing signal generator 13 on the basis of a reference drum rotation signal DEF supplied through an input terminal 3 at such timings that sample values can be extracted from previously determined portions of the envelope signal Sa corresponding to the reproduced FM signal PBFM reproduced for each vertical scanning period. In other words, the reset signal RST is generated for each time interval obtained by dividing one vertical scanning period by N (N: a natural number more than one).

However, when N is set to two or more, it is possible to use the respective sequential level signal Sbi obtained on the basis of the detected envelop signal Sa (obtained by detecting the amplitude of the reproduced FM signal PBFM reproduced from the magnetic tape by use of the rotary magnetic heads), when the inclination angle of the drum central axis and the inclination angle of the lead ring (Lr) central axis are changed under control of the control section in such a way that the magnitude of the respective sequential level signals can be equalized to each other.

Further, after the inclination angle of the drum central axis and the inclination angle of the lead ring (Lr) central axis have been controllably changed to an appropriate value, respectively, tracking adjustment is executed under control of the control section by controlling the rotational phase of the capstan motor relative to the reference rotation signal DFF of the drum motor. In this case, the number N=1 can be also adopted. In summary, the angle changing operation and the tracking adjusting operation are both executed in sequence alternately in order that the recorded traces (tracks) formed on the magnetic tape can match the rotary locus of the rotary magnetic heads. It is thus possible to reproduce video signals under noise-less conditions even in the trick play operation. Here, the angle changing operation is that the inclination angle of the drum central axis and the inclination angle of the lead ring (Lr) central axis are changed. And, the tracking adjusting operation is that the rotary phase of the capstan motor is controlled relative to the reference rotation signal of the drum motor.

Now, in the circuits as shown in FIGS. 11 and 12, the output signal Sci of the peak hold circuit $7p$ is converted from the analog signals to the digital signals by the analog-digital convertor 8 separately for each pulse wave form, and then supplied to a control section 9 including a microcomputer unit. To the control section 9, a mode signal MOD is also supplied via an input terminal 4.

Figure 1:
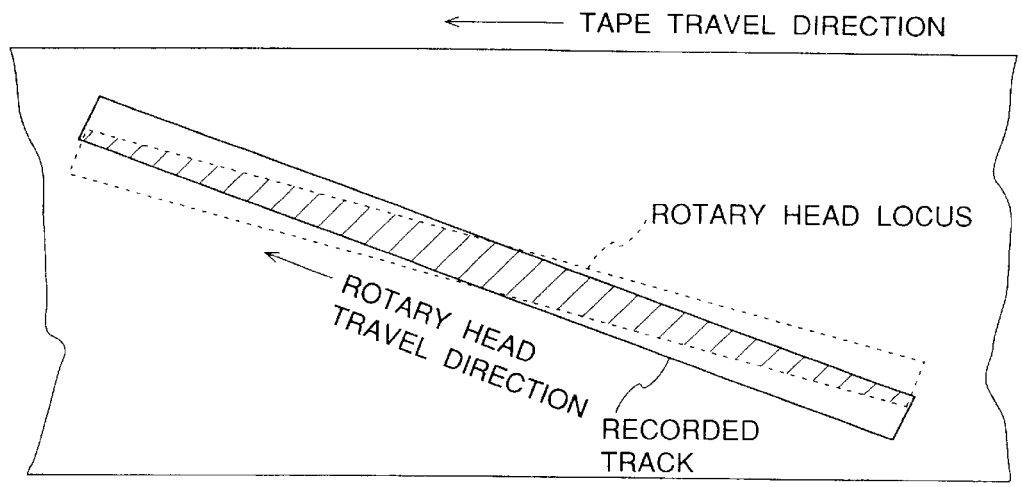
FIG. 1 is a plane view for assistance in explaining the relationship between recorded traces formed on a magnetic tape and the rotary locus of a rotary magnetic head.

As already explained, when the reproduction operation is effected at a magnetic tape travel speed different from that of the recording operation, the locus of the rotary magnetic heads during the reproduction operation is offset from the recorded traces (tracks) formed on the magnetic tape as shown in FIG. 1. Therefore when data are recorded along the two adjacent recorded traces by use of two rotary magnetic heads having two different azimuth angles, the data can be reproduced from only the area where two portions (the recorded trace and the rotary locus) enclosed by the solid lines and the dot lines in FIG. 1 are overlapped with each other.

When the reproduction operation is effected at a magnetic tape travel speed different from that of the recording operation, the locus of the rotary magnetic head during the reproduction operation is offset from the recorded traces (tracks) formed on the magnetic tape. Thus, the envelope signal Sa obtained by detecting the amplitude of the reproduced FM signal PBFM becomes a signal as shown in FIG. 3B, 15B, 17B or 19B. That is, the levels of the sampled signals obtained by dividing the envelope signal Sa into a plurality of time intervals during one vertical scanning period are different from one another.

However, in the invention, the inclination angle of the drum central axis and the inclination angle of the lead ring (Lr) central axis are controllably changed to an appropriate value, respectively in such a way that the levels of the sampled signals obtained by dividing the envelope signal Sa into a plurality of time intervals during one vertical scanning period become the same. It is thus possible to match the direction of the rotary locus of the rotary magnetic heads with that of the recorded traces formed on the magnetic tape in the reproduction operation.

Figure 22:
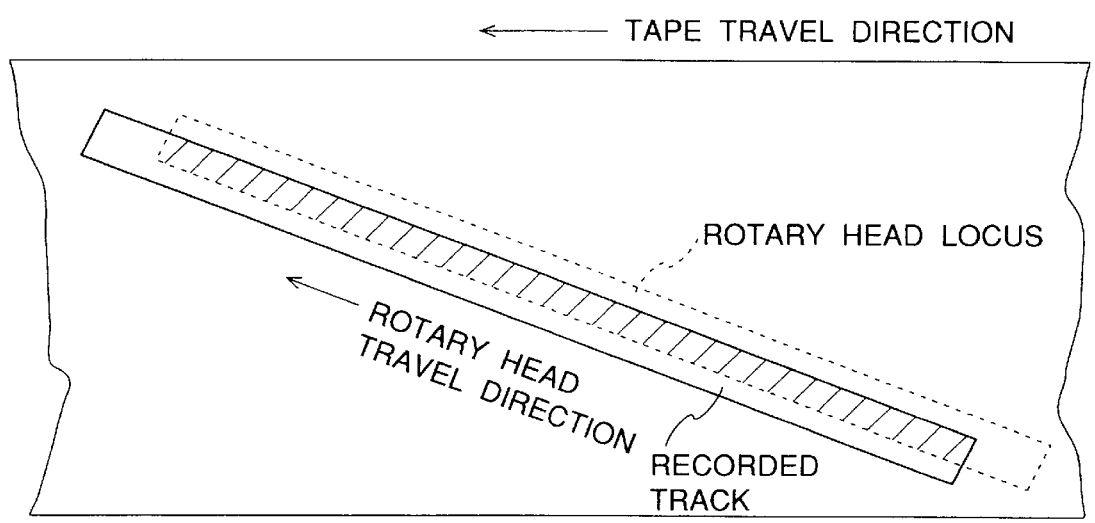
FIG. 22 is a plane view for assistance in explaining the relationship between the recorded traces formed on the magnetic tape and the rotary locus of the rotary magnetic head.

As described above, the inclination angle of the drum central axis and the inclination angle of the lead ring (Lr) central axis will be changed so that the rotary locus of the rotary magnetic head matches with the recorded traces (tracks) formed on the magnetic tape in the reproduction operation. Further, the levels of the sampled signals obtained by dividing the envelope signal Sa into a plurality of time intervals during one vertical scanning period will become the same. There exists the case where the head locus and the recorded trace overlap with each other only in a part of the width direction thereof, as shown in FIG. 22. In this case, however, when the rotational phase of the capstan motor is shifted during tracking, it is possible to overlap both the head locus and the recorded trace.

In the VTR according to the present invention, the mode signal MOD indicative of the travel speed of the magnetic tape decided according to the reproduction mode is given to the control section 9 via an input terminal 4 of the circuit as shown in FIG. 11 or FIG. 12. Further, data C1 indicative of the current inclination angle of the drum central axis is given from the control circuit 10 to the control section 9. Further, a signal Sg for rotating the motor 11 in the reverse direction is generated by the control section 9, and the generated signal Sg is given to the control circuit 10. Further, data D1 indicative of a target numerical value for stopping the motor in correspondence to the magnetic tape travel speed decided according to the reproduction mode is given from the control section 9 to the control circuit 10. Further, after the numerical data D1 has been given from the control section 9 to the control circuit 10, a signal St for rotating the motor 11 in the forward direction is given from the control section 9 to the control circuit 10.

Therefore, the control circuit 10 can controllably drive the motor 11 in a predetermined direction and further stop the motor 11 at a position determined on the basis of the target numerical data D1 for stopping the motor 11. The motor 11 is rotated at a relatively low speed so as to be stopped accurately at a position determined on the basis of the target numerical data D1 for stopping the motor 11.

As described above, the condition that the inclination angle of the drum central axis is set to an appropriate angle suitable for the magnetic tape travel speed decided according to the reproduction mode by the driving operation of the motor 11. There is a case where a difference in level among a plurality of sampled signals extracted at N positions of the envelope signal Sa by detecting the amplitude of the reproduced FM signal PBFM reproduced by the rotary magnet heads during one vertical scanning period exceeds a predetermined value. That is, there is a case where an offset value of the inclination angle between the rotary locus of the rotary magnetic head and the recorded traces formed on the magnetic tape in the reproduction operation exceeds a predetermined value. In these cases, the motor 11 is driven in such a direction that the inclination angle of the drum central axis can be changed to correct the offset value.

The above-mentioned correct operation is repeated until the difference in level among a plurality of sampled signals extracted at N positions of the envelope signal Sa by detecting the amplitude of the reproduced FM signal PBFM obtained by the rotary magnet head during one vertical scanning period drops below a predetermined value. There is a case where the difference in level among a plurality of sampled signals extracted at N positions of the envelope signal Sa drops below a predetermined value by the above-mentioned correction operation. When the level of the sampled signals is low, the rotary locus of the rotary magnetic head would match the recorded traces (tracks) formed on the magnetic tape in the reproduction operation. There is a case where the head locus and the recorded trace overlap with each other only in a part of the width direction thereof, as shown in FIG. 22. In this case, the tracking operation is executed by changing the rotational phase of the capstan motor in order to overlap the both with each other in the width direction perfectly.

By doing this, it is possible to control the reproduction operation in such a state that the rotary locus of the rotary magnetic head can roughly match the recorded trace (track) formed on the magnetic tape in the reproduction operation. Further, the mode signal MOD given to the control section 9 via the input terminal 4 in the circuit as shown in FIG. 11 or 12 is data for setting the inclination angle of the drum central axis. Therefore, when the operation mode of the magnetic recording and reproducing apparatus is in the normal recording mode, the inclination angle of the drum central axis is set and fixed to a standard inclination value.

Figure 23:
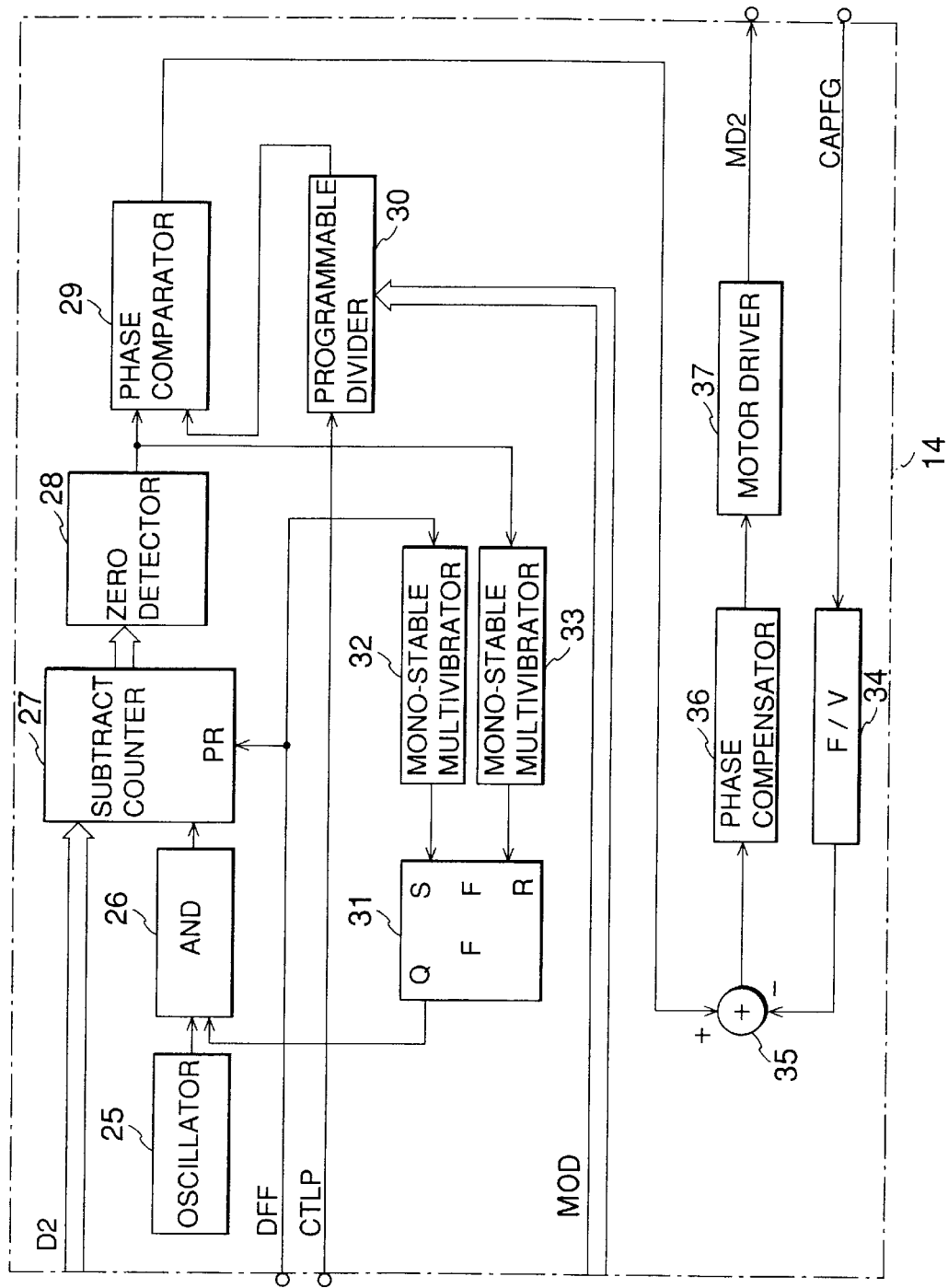
FIG. 23 is a block diagram showing an example of a control circuit 14 shown in FIG. 11.

FIG. 23 shows a practical circuit construction of the control circuit 14 shown in FIG. 11. The control circuit 14 controls the rotational phase of the capstan motor 15. In FIG. 23, data D2 indicative of the value for shifting a compared reference signal is given from the control section 9 to the control circuit 14. In addition, a reference drum rotation signal DFF is given to the control circuit 14 via an input terminal 3, and a control signal CT is also given to the control circuit 14 via an input terminal 5.

Further, a motor drive signal MD2 is given from the control circuit 14 to the capstan motor 15. Further, a signal CAPFG generated by a frequency generator mounted on the capstan motor 15 is given from the capstan motor 15 to the control circuit 14.

Further, the control circuit 10 shown in FIG. 11 controllably drives the motor 11 in order to change the inclination angle of the drum central axis. In FIG. 11, a block 12 shown in the vicinity of the motor 11 designates a sensor including the rotary encoder RE mounted on the motor 11 and the position sensor PS (e.g., photo-interrupter 50 as shown in FIG. 10B).

The driving and control operation of the motor 11 by the control circuit 10 will be described hereinbelow.

The target numerical data D1 for stopping the motor and the signal St for rotating the motor 11 in the forward direction are given from the control section 9 to the control circuit 10. Further, the data C1 indicative of the current inclination angle value of the drum central axis is given from the control circuit 10 to the control section 9.

Further, the motor drive signal MD1 is given from the control circuit 10 to the motor 11. Further, a rotation pulse RPLS generated by the rotary encoder RE and the reference position signal STA generated by the position sensor PS are both given from the sensor 12 to the control circuit 10.

Figure 24:
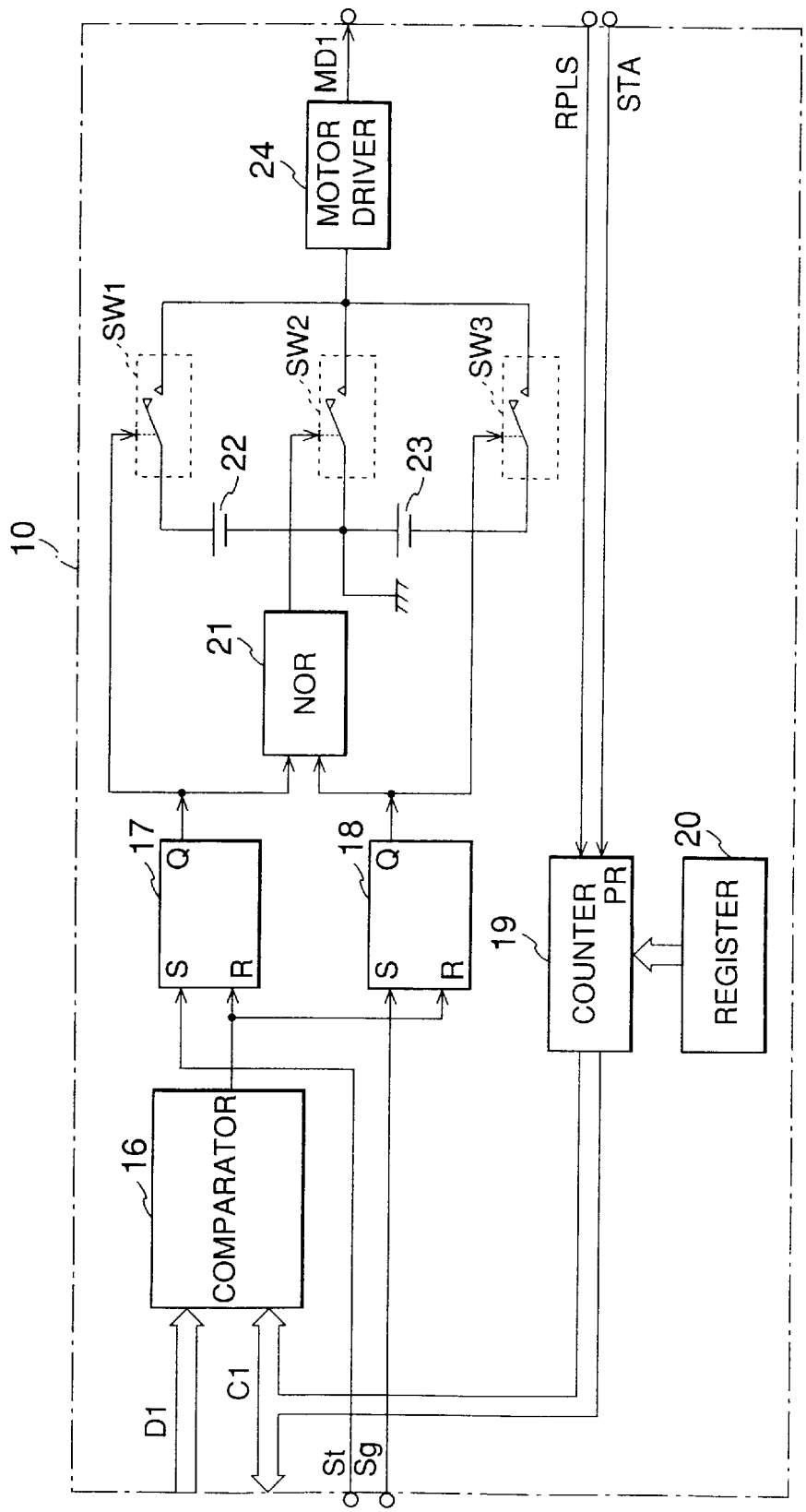
FIG. 24 is a block diagram showing an example of a control circuit 10 shown in FIG. 11.

FIG. 24 shows a practical circuit construction of the control circuit 10 shown in FIG. 11. In FIG. 24, the reference position signal STA generated by the position sensor PS of the sensor 12 is given to a preset terminal PR of a counter 19. The counter 19 then presets a numerical value stored in a register 20, and further begins to counting the rotary pulse RPLS generated by the rotary encoder RE of the sensor 12 as a counted pulse. The counted value C1 indicative of the current inclination angle of the drum central axis is given to a comparator 16 and the control section 9.

As already explained, in FIGS. 11 and 12, the signal Sc indicative of the signal level Sb of the envelope signal Sa corresponding to the reproduced FM signal PBFM reproduced at each of N intervals during one vertical scanning period is converted by the analog-digital convertor 8 into digital signals. The converted digital signals are given to the control section 9. The control section 9 calculates a difference between the two given data, and decides the target numerical data D1 for stopping the motor at a position which corresponds to the target value of the inclination angle of the drum central axis. The decided numerical data D1 is given to the control circuit 10.

Further, there is a case where the calculated difference between the two sequential signals indicative of the signal levels of the envelope signal Sa corresponding to the reproduced FM signal PBFM reproduced at each of N intervals during one vertical scanning period is higher than the calculated difference between the two obtained at an interval before the current interval. In this case, the control section 9 generates a signal Sg (for rotating the motor 11 in the reverse direction) to the control circuit 10 so that the motor 11 can be rotated to change the inclination angle of the drum central axis by a predetermined rate in the direction opposite to the preceding direction (in which the inclination angle of the drum central axis has been changed at the preceding interval).

When the signal St for rotating the motor 11 in the forward direction is generated by the control section 9, and then given to the control circuit 10, a set-reset flip-flop 17 of the control circuit 10 shown in FIG. 24 is set in response to the signal St.

Further, when the signal Sg for rotating the motor 11 in the reverse direction is generated by the control section 9, and then given to the control circuit 10, a set-reset flip-flop 18 of the control circuit 10 shown in FIG. 24 is set in response to the signal Sg.

In FIG. 24, when the set-reset flip-flop 17 is set, a high-level signal is outputted from a Q output terminal thereof to turn on a switch SW1. When the switch SW1 is turned on, since a positive power supply 22 is connected to a motor drive circuit 24, the motor drive signal MD1 for rotating the motor 11 in the forward direction is given from the motor drive circuit 24 to the motor 11 shown in FIG. 11 or 12. When the motor 11 is rotated in the forward direction, since the first inclination rate change screw 39 and the second inclination rate change screw 45 both shown in FIG. 10A are driven via the gears 40 and 41 and the gears 43 and 44, respectively, the inclination angle of the drum central axis and the inclination angle of the lead ring (Lr) central axis are both changed.

Further, in FIG. 24, when the set-reset flip-flop 18 is set, a high-level signal is outputted from a Q output terminal thereof to turn on a switch SW3. When the switch SW3 is turned on, since a negative power supply 23 is connected to a motor drive circuit 24, the motor drive signal MD1 for rotating the motor 11 in the reverse direction is given from the motor drive circuit 24 to the motor 11 shown in FIG. 11 or 12. When the motor 11 is rotated in the reverse direction, since the first inclination rate change screw 39 and the second inclination rate change screw 45 both shown in FIG. 10A are driven via the gears 40 and 41 and the gears 43 and 44, respectively, the inclination angle of the drum central axis and the inclination angle of the lead ring (Lr) central axis are both changed.

As described above, the inclination angle of the drum central axis and the inclination angle of the lead ring (Lr) central axis are both changed to the target positions, respectively due to the motor rotation in both the forward and reverse directions. Thus, the numerical value C1 of the counter 19 (shown in FIG. 24) indicative of the current inclination angle of the drum central axis changes. Further, the numerical value C1 of the counter 19 given to the comparator 16 (both shown in FIG. 24) matches the target numerical data D1 for stopping the motor (given from the control section 9 shown in FIG. 11 or 12 to the comparator). The comparator 16 then outputs a match pulse to reset the set-reset flip-flop 18, so that a high level signal is outputted from a NOR circuit 21 to turn on a switch SW2. When the switch SW2 is turned on, the ground potential is connected to an input side of the motor drive circuit 24. The motor 11 is then stopped by the motor drive circuit 24, so that the inclination angle of the drum central axis is held at the target position determined by the control section 9.

As described above, in the VTR according to the present invention, the inclination angle of the drum central axis is changed repeatedly under control operation of the control section 9 and the control circuit 10. It is thus possible to roughly match the rotary locus of the rotary magnetic head with the recorded traces formed on the magnetic tape.

However, when the rotary locus and the recorded trace are overlapped with each other as shown in FIG. 22, the reproduced FM signal PBFM is to be reproduced in a lower level. This happens even if the rotary locus of the rotary magnetic head can be matched in direction with the recorded traces formed on the magnetic tape in the reproduction operation. This matching is made by changing the inclination angle of the drum central axis and the inclination angle of the lead ring (Lr) central axis in such a way that the signal levels of the sequential data indicative of the envelope signal Sa obtained by detecting the amplitude of the reproduced FM signal PBFM reproduced at each of N intervals during one vertical scanning period can be equalized with each other.

In this case, the rotational phase of the capstan motor is shifted during tracking operation to overlap both with each other under excellent conditions, with the result that it is possible to obtain the high level reproduced FM signal PBFM.

For this purpose, in the VTR according to the present invention, in order to maximize the reproduction signal output, the rotational phase of the capstan motor is controlled on the basis of a control signal obtained by comparing the signal obtained by dividing the output signal of the capstan frequency generator with a signal obtained by delaying the periodical signal related to the vertical synchronizing signal of the input video signal. Further, the rotational phase of the capstan motor is so controlled that the overlap condition of both the head rotary locus and the recorded traces can be held immediately before the start of the recording operation. In more detail, at a time immediately before the start of the recording operation, the relationship between the recorded traces newly formed on the magnetic tape and the control pulse is determined in such a way as to match the relationship between the recorded traces already formed on the magnetic tape and the control pulse, under control of the control section 9 and a control circuit 14.

Again, with reference to FIG. 23 showing a practical example of the control circuit 14 shown in FIG. 11 or FIG. 12, the reference drum rotation signal DFF having a high level and a low level switched alternately for each vertical scanning period in synchronism with the input video signal is given to both a subtract counter 27 and a mono-stable multi-vibrator 32 via a terminal 3 shown in FIG. 11 or 12. To the subtract counter 27, the data D2 indicative of the value for shifting the compared reference signal is given from the control section 9 shown in FIG. 11 or 12, and further a clock signal is given from an AND circuit 26. Further, a control signal CTLP as a counted signal is given to a programmable divider 30 whose division ratio can be changed in response to a mode signal MOD inputted via a terminal 5 shown in FIG. 11 or 12.

Therefore, when the reference drum rotation signal DFF is given to the preset terminal PR of the subtract counter 27, the data D2 indicative of the value for shifting the compared reference signal is preset in the subtract counter 27. The numerical value D2 preset to the subtract counter 27 is subtracted one by one by the clock pulse generated by an oscillator 25 and given to the subtract counter 27 via the AND circuit 26.

Further, when the numerical value of the subtract counter 27 is reduced down to zero, a zero detector 28 generates a high level signal to both a phase comparator 29 and a mono-stable multi-vibrator 33. Here, since the reference drum rotation signal DFF is given to the preset terminal PR of the subtract counter 27, when the subtract counter 27 is preset, the mono-stable multi-vibrator 32 is triggered by the same reference drum rotation signal DFF. Therefore, the output signal of the mono-stable multi-vibrator 32 is given to a set terminal S of a flip-flop 31, so that a high level signal is outputted from the Q output terminal of the flip-flop 31 to the AND circuit 26. Therefore, the clock pulse generated by the oscillator 25 can be given from the oscillator 25 to the subtract counter 27 via the AND circuit 26, so that the subtract counter 27 starts counting.

Further, the mono-stable multi-vibrator 33 is triggered when the numerical value of the subtract counter 27 is reduced to zero and thereby the high level signal is outputted by the zero detector 28. The output signal of the mono-stable multi-vibrator 33 is then given to the reset terminal R of the flip-flop 31 to reset the flip-flop 31, so that a low level signal is outputted from the Q output terminal of the flip-flop 31 to the AND circuit 26. As a result, the clock pulse generated by the oscillator 25 cannot be given to the subtract counter 27 via the AND circuit 26. In other words, the AND circuit 26 to which a gate signal is given from the flip-flop 31 is so operated as to restrict the application of the clock pulse from the oscillator 25 to the subtract counter 27 in such a way the high level output signal can be outputted only once to the zero counter 28 during one period of the reference drum rotation signal DFF.

Here, the data D2 indicative of the value for shifting the compared reference signal given from the control section 9 to the control circuit 14 shown in FIG. 11 or 12 can decide a time from when the reference drum rotation signal DFF is given to when the high level signal is outputted by the zero detector 28. The rotational phase of the capstan motor 15 thus can be changed according to the data D2 indicative of the target rotation phase. Further, an error signal generated by a phase comparator 29 is given to a subtracter 35. Further, a signal CAPFG generated by the frequency generator of the capstan motor 15 is given to a frequency-voltage convertor 34 to obtain a voltage signal. The obtained voltage signal is also given to the subtracter 35. The subtraction result of the subtracter 35 is given to a phase compensate circuit 36 for compensating for the phase of the capstan motor. The compensate signal is given to a motor drive circuit 37. The motor drive circuit 37 outputs the motor drive signal MD2 to the capstan motor 15. When the rotation phase of the capstan motor is changed, the rotary locus of the rotary magnetic head can be changed in the width direction of the recorded trace. It is thus possible to control the tracking by changing the rotational phase of the capstan motor.

Figure 25:
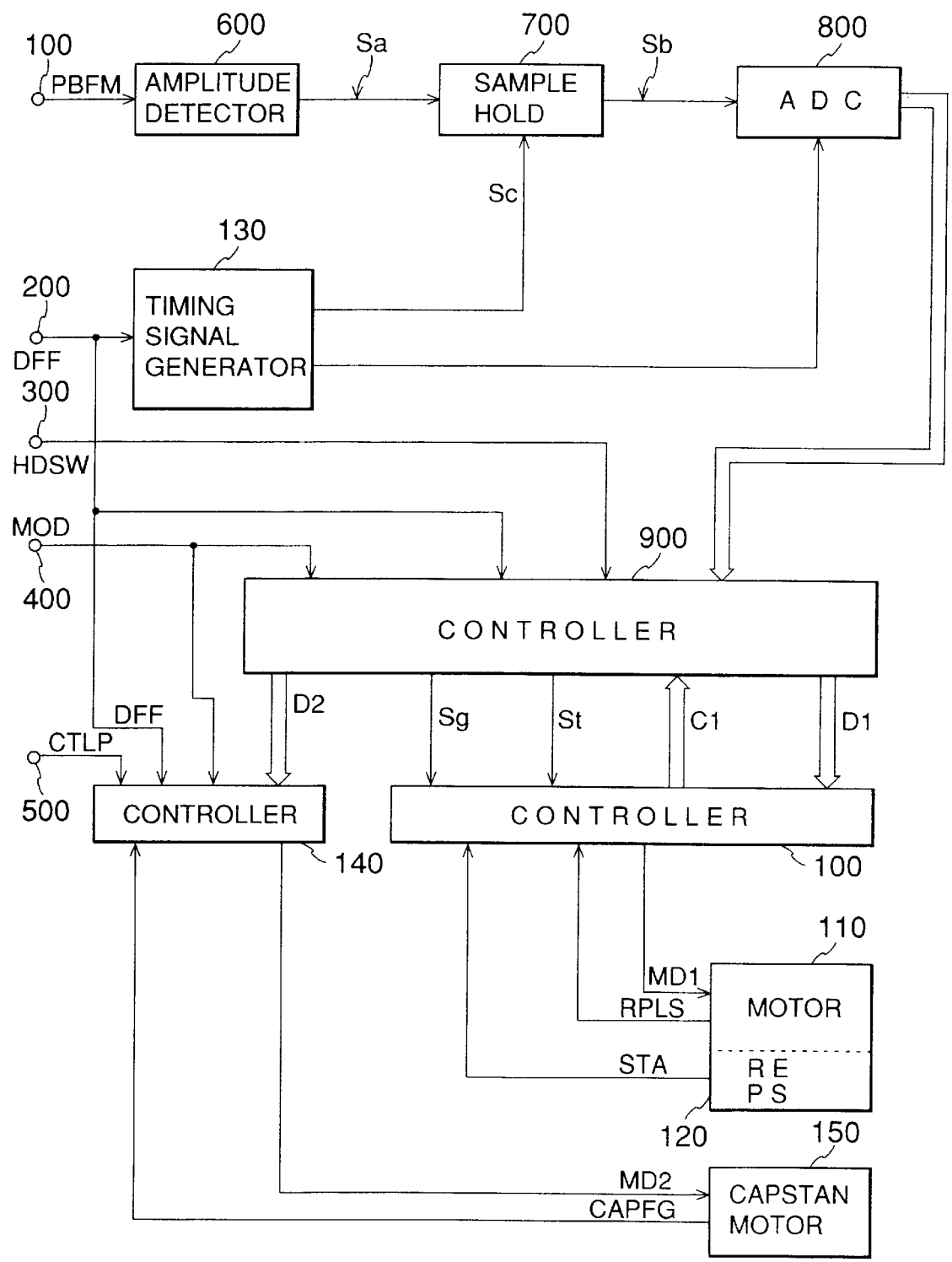
FIG. 25 is a block diagram showing a third embodiment of the tacking error data detecting apparatus according to the present invention.

FIG. 25 shows the third embodiment of the tracking error data detecting apparatus for a VTR according to the present invention. In FIG. 25, any one (having the higher signal level) of the reproduced FM signals of frequency modulated signal form obtained separately by the two rotary magnetic heads arranged adjacent to each other and having two different azimuth angles, respectively is supplied to an input terminal 100. The supplied signal is the reproduced FM signal PBFM as shown in FIGS. 27A, 29A and 30A. The wave form of the reproduced FM signal PBFM is detected by an amplitude detector 600. That is, the detector 600 outputs the envelope signal Sa as shown in FIGS. 27B, 29B and 30B of the reproduced FM signal PBFM. The detected envelope signal Sa is given to a sample hold circuit 700.

The sample hold circuit 700 extracts samples of the envelope signal Sa on the basis of a sampling pulse Sc as shown in FIGS. 27C, 29C and 30C generated by a timing signal generator 130. The sample hold circuit 700 then holds a peak value of the sampled signal for a predetermined time period at each timing of the sampling signal Sc, and outputs the sampled and held signal Sb as shown in FIGS. 27D, 29D and 30D to an analog-digital convertor 800. Therefore, the analog-digital convertor 800 can output the digital signals indicative of the reproduced FM signal PBFM.

On the other hand, in FIG. 25, a mode signal MOD, a head select signal HDSW, a reference drum rotation signal DFF, and data C1 indicative of the current inclination angle of the drum central axis are all given to a control section 900. The control section 900 decides, on the basis of the head select signal HDSW, as to that the digital signals given by the analog-digital convertor 800 corresponds to which one (having the higher signal level) of the reproduced FM signals reproduced separately by the two rotary magnetic heads arranged adjacent to each other and having two different azimuth angles. The control section 900 calculates an accurate tracking error (off-track) data on the basis of the decided results, and outputs the calculated tracking error data.

As already explained, there is a case where the relationship between the recorded traces formed on the magnetic tape and the moving locus of the rotary magnetic heads is as shown in FIG. 26 in the reproduction operation. In this case, the rotary magnetic heads are not switched on the basis of the head select signal HDSW in the reproduction operation. The reproduced FM signal PBFM is thus generated when the rotary magnetic heads cross one recorded trace. Therefore, the data obtained by sampling the envelope Sa of the reproduced FM signal PBFM at each time interval obtained by dividing one vertical scanning period into N (N: two or more) are the off-track data. Here, the off-track rate increases with decreasing signal level of the reproduced FM signal PBFM.

Here, the reason why the envelope signal Sa of the reproduced FM signal PBFM is sampled at each time interval obtained by dividing one vertical scanning period into N (N: two or more) is to detect the off-track data (tracking error data). The off-track data represents the inclination angle data of the drum central axis in dependence upon the envelope state of the reproduced FM signal PBFM. Therefore, when the levels of all the sample values of the envelope signal Sa of the reproduced FM signal PBFM are the same at each of the N time intervals during one vertical scanning period, this indicates that the inclination angle of the drum central axis is set to such a state that the recorded traces formed on the magnetic tape match the moving locus of the rotary magnetic heads in the reproduction operation.

On the other hand, in the case where the relationship between the recorded traces formed on the magnetic tape and the moving locus of the rotary magnetic heads is as shown in FIG. 28 in the reproduction operation, the rotary magnetic heads are switched on the basis of the head select signal HDSW in the reproduction operation. The reproduced FM signal PBFM is thus generated when the rotary magnetic heads cross a plurality of the recorded traces formed on the magnetic tape by the two rotary magnetic heads having two different azimuth angles, respectively during one vertical scanning period. This results in that the reproduced signal obtained as the output of the already-explained integrated circuit of the VTR becomes as shown in FIG. 29A or 30A.

Therefore, in the case where the reproduced FM signal PBFM is being generated as shown in FIG. 29A or 30A, even if the envelope signal Sa of the reproduced FM signal PBFM is sampled at each time interval obtained by dividing one vertical scanning period into N (N: two or more), the obtained sampled data at each time interval do not necessarily indicate the off-track data.

Therefore, the control section 900 decides, on the basis of the head select signal HDSW, as to that the digital signals given by the analog-digital convertor 800 corresponds to which one (having the higher signal level) of the reproduced FM signals reproduced separately by the two rotary magnetic heads having two different (positive and negative) azimuth angles.

Further, when the reproduced FM signal PBFM is obtained by the rotary magnetic head having a negative azimuth angle, the control section 900 inverts the polarity of the digital signals. The control section 900 then calculates an accurate tracking error (off-track) data on the basis of the inverted results, and outputs the calculated tracking error data.

Now, when the sampled values of the reproduced signal obtained by the rotary magnetic heads are denoted by B; the digital signals indicative of the maximum sampled values obtained when the rotary magnetic heads are in a perfect on-track state are denoted by Bmax; the digital signals indicative of the minimum sampled values obtained when the rotary magnetic heads are in a perfect off-track state are denoted by Bmin; the tracking error data obtained when the rotary magnetic head having a magnetic gap of a positive azimuth angle is selected are denoted by TEp; and the tracking error data obtained when the rotary magnetic head having a magnetic gap of a negative azimuth angle is selected are denoted by TEn, the relationship among these can be expresses as $$TEp=B-Bmin \quad (1)$$

$$TEn=Bmax-B \quad (2)$$

The above-mentioned digital signals Bmax obtained when the rotary magnetic heads are in a perfect on-track state, and the digital signals Bmin obtained when the rotary magnetic heads are in a perfect off-track condition are denoted by Bmin can be detected in succession. However, it is also possible to previously store these data in a look-up table.

Here, FIG. 28 and FIGS. 29A to 29F show the case where the track widths of the two rotary magnetic heads arranged adjacent to each other and having two different positive and negative azimuth angles, respectively are the same with respect to each other.

On the other hand, FIGS. 30A to 30F show the case where the track widths of the two rotary magnetic heads arranged adjacent to each other and having two different positive and negative azimuth angles, respectively are different from each other.

As already explained, in the popular VTRs, one reproduced signal (having the higher signal level) is selected from the two reproduced frequency modulated signals obtained separately by the two rotary magnetic heads arranged adjacent to each other and having two different azimuth angles, respectively, while the rotary locus of the two rotary magnetic heads is crossing the recorded traces formed on the magnetic tape. In this case, in order to improve the quality of the reproduced picture in various trick play operation at a relatively low cost, a rotary magnetic head for standard play SP and a rotary magnetic head for extended play EP are usually arranged adjacent to each other as the double-azimuth head.

In the VTRs of VHS (trade mark) system widely used as the popular VTRS, when the double-azimuth head is constructed by the rotary magnetic head for standard play SP and the rotary magnetic head for extended play EP, although the track width of the rotary magnetic head for SP is 58 micrometer, the track width of the rotary magnetic head for EP is 19.3 micrometer in the case of the three-time speed mode, for instance. Thus, the signal levels of the reproduced FM signals obtained by the two rotary magnetic heads for constituting the double azimuth head differ according to the difference in the track width.

FIG. 31 is a diagram showing the difference between the signal level Bo of the reproduced FM signal obtained by the rotary magnetic head for SP and the signal level Ao of the reproduced FM signal obtained by the rotary magnetic head for EP.

In FIG. 31, when the double-azimuth head constructed by two rotary magnetic heads having two different track widths, respectively is used, the control section discriminates one of the digital signals of the two reproduced frequency modulated signals obtained by the double-azimuth head constructed by two rotary magnetic heads arranged adjacent to each other and having two different azimuth angles, on the basis of the head select signal given to the control section. The control section calculates and outputs the tracking error signal on the basis of the normalized digital signals and the inverted normalized digital signals. The normalized digital signals are obtained by the sampled values of the detected envelope of the reproduced FM signal obtained at each interval during one vertical scanning period when a predetermined one of the two rotary magnetic heads is being selected. And, the inverted normalized digital signals are obtained by the sampled values of the detected envelope of the reproduced FM signal during at each interval during one vertical scanning period when the other (different from the predetermined one) of the two rotary magnetic heads is being selected.

In FIG. 30A, the envelope signal Sa of FIG. 30B obtained by detecting the reproduced FM signal PBFM of FIG. 30A by the amplitude detector 600 of FIG. 25 indicates one envelope signal Sa obtained by detecting one (having the higher signal level) of the two reproduced FM signals reproduced separately by the two rotary magnetic heads having two different (positive and negative) azimuth angles and track widths. Therefore, even if the envelope signal Sa of FIG. 30B is given to the sample hold circuit 700 of FIG. 25 to sample and hold the envelope signal Sa, the N-units of the samples signals Sb of FIG. 30D obtained during one vertical scanning period on the basis of the sampling pulse Sc of FIG. 30C are based upon the reproduced FM signals obtained by the two rotary magnetic heads of two different azimuth angles and track widths. It is thus impossible to obtain accurate tracking error data.

Therefore, the control section 900 to which the digital signals obtained by AD converting the sampled signal Sb of FIG. 30D with the analog-digital convertor 800 are supplied decides any one (having the higher signal level) of the two reproduced FM signals reproduced separately by the two rotary magnetic heads adjacent to each other and having two different (positive and negative) azimuth angles and track widths on the basis of the head select signal HDSW. The control section 900 further inverts the polarity of the digital signals obtained by the reproduced FM signal obtained by the rotary magnetic head having a magnetic gap with a negative azimuth angle. The control section 900 further calculates the tracking error data TEp or TEn in accordance with the already-explained expressions (1) and (2), and generates the signal as shown in FIG. 30F.

However, since the signal as shown in FIG. 30F includes a difference in the signal level caused by the difference in track width between the two rotary magnetic heads, it is impossible to use the signal as shown in FIG. 30F as the accurate tracking error data (off-track data).

To overcome this problem, the control section 900 compensates for the signal level of the signal as shown in FIG. 30F to eliminate an error caused by the difference in track width between the two rotary magnetic heads. And then the control section 900 generates the compensated signal as shown in FIG. 30G as the accurate tracking error data (off track data).

In more detail, there is a case where the track widths of the two rotary magnetic heads arranged adjacent to each other and having two different azimuth angles, respectively are different from each other. In this case, the control section 900 normalizes the digital signals supplied by the analog-digital convertor 800 in such a way that the predetermined maximum output value of the two reproduced FM signals obtained by the two rotary magnetic heads corresponds to a predetermined value. And further the control section 900 discriminates one (having a higher signal level) of the digital signals of the two reproduced FM signals obtained by the double-azimuth head constructed by two rotary magnetic heads arranged adjacent to each other and having two different azimuth angles on the basis of the head select signal given to the control section 900.

Further, the control section 900 calculates and outputs the accurate tracking error signal in accordance with the expressions (1) and (2) above, on the basis of the normalized digital signals and the inverted normalized digital signals. The normalized digital signals are obtained by the sampled values of the detected envelope of the reproduced FM signal at each time interval during one vertical scanning period when a predetermined one of the two rotary magnetic heads is being selected. And, the inverted normalized digital signals are obtained on the basis of the inverted normalized digital signals obtained by the sampled values of the detected envelope of the reproduced FM signal at each time interval during one vertical scanning period when the other (different from the predetermined one) of the two rotary magnetic heads is being selected.

Further, when the difference in signal level between the two rotary magnetic heads is caused by the difference in track width as shown by Bo and Ao in FIG. 31, the reproduced FM signal PBFM as shown in FIG. 30A can be divided into two signal portions corresponding to the low-level period of the head select signal HDSW and to the high-level period of the same head select signal HDSW as shown in FIG. 30E. Therefore, it is possible to generate the accurate tracking error signal by multiplying the digital signals corresponding to the reproduced FM signal obtained by the rotary magnetic head having the narrow track width by a numerical value Bo/Ao. Further, the obtained tracking error signals are used to change the inclination angle of the drum central axis and the inclination angle of the lead ring (Lr) central axis under control of the control section.

Further, after the inclination angle of the drum central axis and the inclination angle of the lead ring (Lr) central axis have been controllably changed to an appropriate value under control of the control section, respectively, tracking adjustment is executed under control of the control section by controlling the rotational phase of the capstan motor relative to the reference rotation signal DFF of the drum motor. In this case, the number N=1 can be also adopted. In summary, when the angle changing operation and the tracking adjusting operation are both executed in sequence alternately in order that the recorded traces (tracks) formed on the magnetic tape can match the rotary locus of the rotary magnetic heads, it is possible to reproduce video signals under noise-less conditions even in the trick play operation. Here, the angle changing operation is to change the inclination angle of the drum central axis and the inclination angle of the lead ring (Lr) central axis. And, the tracking adjusting operation is to control the rotary phase of the capstan motor relative to the reference rotation signal of the drum motor.

By the way, there exists the case where the head locus and the recorded trace overlap with each other only in a part of the width direction thereof, as shown in FIG. 22. This happens even if the inclination angle of the drum central axis and the inclination angle of the lead ring (Lr) central axis are changed so that the rotary locus of the rotary magnetic head matches the recorded traces (tracks) formed on the magnetic tape in the reproduction operation; that is, even if the levels of the sampled signals obtained by dividing the envelope signal Sa into a plurality of time intervals during one vertical scanning period become the same. In this case, however, when the rotational phase of the capstan motor is shifted during tracking, it is possible to overlap both the head locus and the recorded trace with respect to each other.

In the VTR according to the present invention, the mode signal MOD indicative of the travel speed of the magnetic tape decided according to the reproduction mode is given to the control section 900 via an input terminal 400 of the circuit as shown in FIG. 25. Further, data C1 indicative of the current inclination angle of the drum central axis is given from a control circuit 100 to the control section 900. Further, a signal Sg for rotating a motor 110 in the reverse direction is generated by the control section 900, and the generated signal Sg is given to the control circuit 100. Further, data D1 indicative of a target numerical value for stopping the motor in correspondence to the magnetic tape travel speed decided according to the reproduction mode is given from the control section 900 to the control circuit 100. Further, after the numerical data D1 has been given from the control section 900 to the control circuit 100, a signal St for rotating the motor 110 in the forward direction is given from the control section 900 to the control circuit 100. Therefore, the control circuit 100 can controllably drive the motor 110 in a predetermined direction and further stop the motor 110 at a position determined on the basis of the target numerical data D1 for stopping the motor 110. The motor 110 is rotated at a relatively low speed so as to be stopped accurately at a position determined on the basis of the target numerical data D1 for stopping the motor 110.

Here, there is a condition that the inclination angle of the drum central axis is set to an appropriate angle suitable for the magnetic tape travel speed decided according to the reproduction mode by the driving operation of the motor 110. Under the conditions, there is a case where a difference in level among a plurality of sampled signals extracted at N positions of the envelope signal Sa by detecting the amplitude of the reproduced FM signal PBFM obtained by the rotary magnet heads during one vertical scanning period exceeds a predetermined value; that is, an offset value of the inclination angle between the rotary locus of the rotary magnetic head and the recorded traces formed on the magnetic tape in the reproduction operation exceeds a predetermined value. The motor 110 is thus driven in such a direction that the inclination angle of the drum central axis can be changed to correct the offset value.

The above-mentioned correct operation is repeated until the difference in level among a plurality of sampled signals extracted at N positions of the envelope signal Sa by detecting the amplitude of the reproduced FM signal PBFM obtained by the rotary magnet head during one vertical scanning period drops below a predetermined value. Further, there is a case where the difference in level among a plurality of sampled signals extracted at N positions of the envelope signal Sa drops below a predetermined value by the above-mentioned correction operation. Suppose that the level of the sampled signals is low; that is, even if the rotary locus of the rotary magnetic head matches the recorded traces (tracks) formed on the magnetic tape in the reproduction operation. When the head locus and the recorded trace overlap with each other only in a part of the width direction thereof, as shown in FIG. 22, the tracking operation is executed by changing the rotational phase of the capstan motor in order to overlap the both with each other in the width direction perfectly. By doing this, it is possible to control the reproduction operation in such a state that the rotary locus of the rotary magnetic head can roughly match the recorded traces (tracks) formed on the magnetic tape in the reproduction operation. Further, the mode signal MOD given to the control section 900 via the input terminal 400 in the circuit as shown in FIG. 25 is data for setting the inclination angle of the drum central axis. Therefore, when the operation mode of the magnetic recording and reproducing apparatus is in the normal recording mode, the inclination angle of the drum central axis is set and fixed to a standard inclination value.

Further, the practical constructions of the control circuits 100 and 140 are the same as with the cases explained with reference to FIGS. 23 and 24, respectively.

Figure 8:
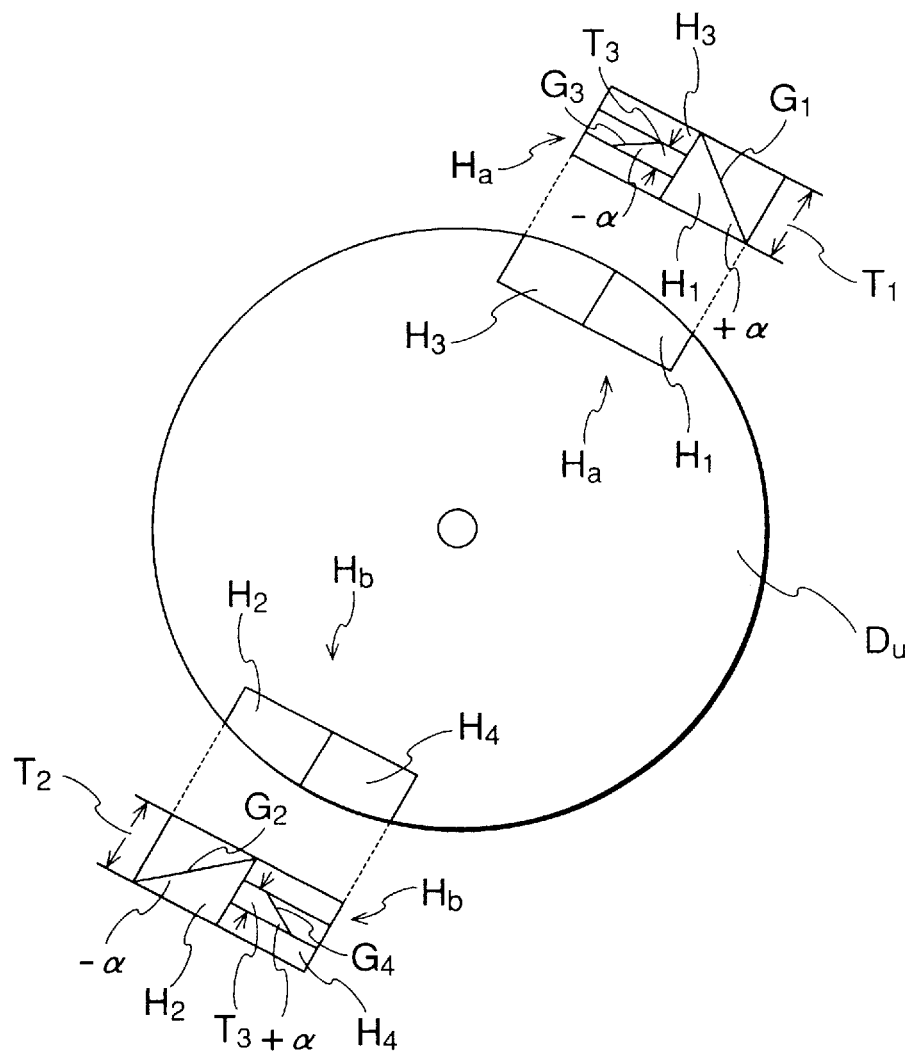
FIG. 8 is a plane view for assistance in explaining the arrangement of rotary magnetic heads.

Here, a practical example of the four rotary magnetic heads H1 to H4 for constituting the two rotary magnetic head sections Ha and Hb both arranged on the drum Du as shown in FIG. 10(A) will be described hereinbelow with reference to FIG. 8. Here, the track width selectively set within a range between two lengths L2 and L1 (L2<L1) is determined as to be belong to the first track width group; and the track width selectively set within a range between two lengths L4 and L3 (L4<L3 and L3<L2) is determined as to be belong to the second track width group. The four rotary magnetic heads H1 to H4 shown in FIG. 8 are mounted on the drum Du in such a construction mode as follows:

The first rotary magnetic head H1 is so constructed as to form a magnetic gap G1 having the track width T1 (freely determined within the above-mentioned range between L2 and L1 and belonging to the first track width group) and a first predetermined azimuth angle +α.

The second rotary magnetic head H2 is so constructed as to form a magnetic gap G2 having the track width T2 (freely determined within the above-mentioned range between L2 and L1, as T1=T2, for instance and belonging to the first track width group) and a second predetermined azimuth angle −α (different from the first azimuth angle +α). The first rotary magnetic head H1 and the second rotary magnetic head H2 are arranged on the circumferential surface of the upper drum at two 180-degree symmetrically opposite positions.

The third rotary magnetic head H3 is so constructed as to form a magnetic gap G3 having the track width T3 (freely determined within the above-mentioned range between L4 and L3 (L3<L2) and belonging to the second track width group) and the second predetermined azimuth angle −α. The third rotary magnetic head H3 is arranged in the vicinity of the first rotary magnetic head H1, and the first and third rotary magnetic heads H1 and H3 constitute the first rotary magnetic head section Ha.

The fourth rotary magnetic head H4 is so constructed as to form a magnetic gap G4 having the track width T4 (freely determined within the above-mentioned range between L4 and L3 T2 (L3<L2) as T4=T3, for instance and belonging to the second track width group) and the first predetermined azimuth angle +α (different from the second azimuth angle −α). The third rotary magnetic head H3 and the fourth rotary magnetic head H4 are arranged on the circumferential surface of the upper drum at two 180-degree symmetrically opposite positions. Further, the fourth rotary magnetic head H4 is arranged in the vicinity of the second rotary magnetic head H2, and the second and fourth rotary magnetic heads H2 and H4 constitute the second rotary magnetic head section Hb.

The fourth and fifth embodiments of the tracking error detecting apparatus for a VTR according to the present invention will be described hereinbelow with reference to FIGS. 32 and 33. The reproduced FM signal PBFM as shown in FIGS. 4B to 7B supplied to an input terminal 101 is a reproduced signal of frequency-modulated signal form which can be obtained in the reproduction operation. The reproduced FM signal PBFM can be obtained as follow:

In the first recording operation mode, the recording operation is effected by use of a combination of the first and second rotary magnetic heads H1 and H2 selected from the four rotary magnetic heads H1 to H4 arranged on the upper drum Du as already explained with reference to FIG. 8. Further, in the second recording operation mode, the recording operation is effected by use of a combination of the third and fourth rotary magnetic heads H3 and H4 selected from the four rotary magnetic heads H1 to H4 arranged on the upper drum Du as already explained with reference to FIG. 8.

Video signals are recorded on the magnetic tap Tp wound around a part of the circumferential surface of the drum and moved at a predetermined travel speed (different according to the first and second recording modes, respectively) by use of the rotary magnetic heads determined for each of the above-mentioned two recording operation modes in accordance with the scanning standard (interlaced scanning of 2:1).

In the recording operation, the video signal is recorded as the recorded signal including the signal of frequency-modulated signal form and corresponding to the sequential one vertical scanning period thereof. That is, the video signal is recorded on the magnetic tape Tp along the recording traces (tracks) arranged in sequence on the magnetic tape via the magnetic gaps having two sequentially and alternately different azimuth angles. In the reproduction of the video signal thus recorded, the inclination angle of the drum central axis is determined in such a way that the rotary locus surface of the rotary magnetic heads roughly matches the recorded traces formed on the recorded magnetic tape Tp wound around a part of the circumferential surface of the drum. Further, in the state where the travel speed of the recorded magnetic tape Tp is set to a value determined according to the reproduction mode (i.e., a reproduction speed is set to zero or a speed 2n-times (n: a natural number) higher than the recording speed). Here, the reproduced FM signal PBFM can be divided into two parts obtained in the reproduction operation mode by use of a combination of the first and fourth rotary magnetic heads H1 and H4 and the other reproduction mode by use of another combination of the second and third rotary magnetic head H2 and H3, respectively.

In other words, the reproduced FM signal PBFM as shown in FIGS. 4B and 6B and supplied to the input terminal 101 is such a signal obtained by reproducing the recorded signal by use of a combination of the first and fourth rotary magnetic heads H1 and H4 (or a combination of the second and third rotary magnetic heads H2 and H3). This reproduction is carried out on condition that video signal has been recorded on the magnetic tape Tp in the first recording mode by use of a combination of the first and second rotary magnetic heads H1 and H2 and further the recorded magnetic tape Tp is kept stopped or moved at a travel speed 2n-times (n: a natural number) higher than the recording tape travel speed.

Figure 5A:
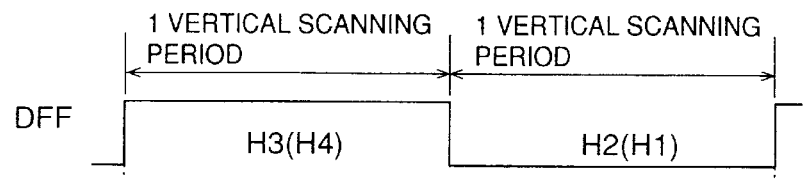
FIGS. 5A to 5F are other diagrams showing the waveforms of signals of the tracking error detecting apparatus for a VTR, in which the rotary locus of the rotary magnetic head is slightly offset away from the inclined recorded traces formed on the magnetic tape.
Figure 5B:
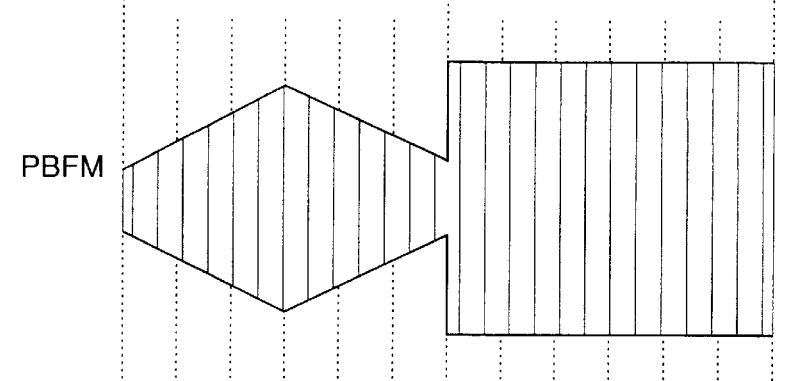

In the same way, the reproduced FM signal PBFM as shown in FIGS. 5B and 7B and supplied to the input terminal 101 is such a signal obtained by reproducing the recorded signal by use of a combination of the third and second rotary magnetic heads H3 and H2 (or a combination of the fourth and first rotary magnetic heads H4 and H1). This reproduction is carried out on condition that video signal has been recorded on the magnetic tape Tp in the second recording mode by use of a combination of the third and fourth rotary magnetic heads H3 and H4 and further the recorded magnetic tape Tp is kept stopped or moved at a travel speed 2n-times (n: a natural number) higher than the recording tape travel speed.

The fourth and fifth embodiments of the tracking error data detecting apparatus for a VTR according to the present invention will be described hereinbelow with reference to FIGS. 32 and 33, respectively. The reproduced FM signal PBFM supplied to the input terminal 101 is detected by an amplitude detector 104, so that an envelope signal Sa of the reproduced FM signal PBFM as shown in FIGS. 4D and 5D is outputted from the amplitude detector 104.

Figure 32:
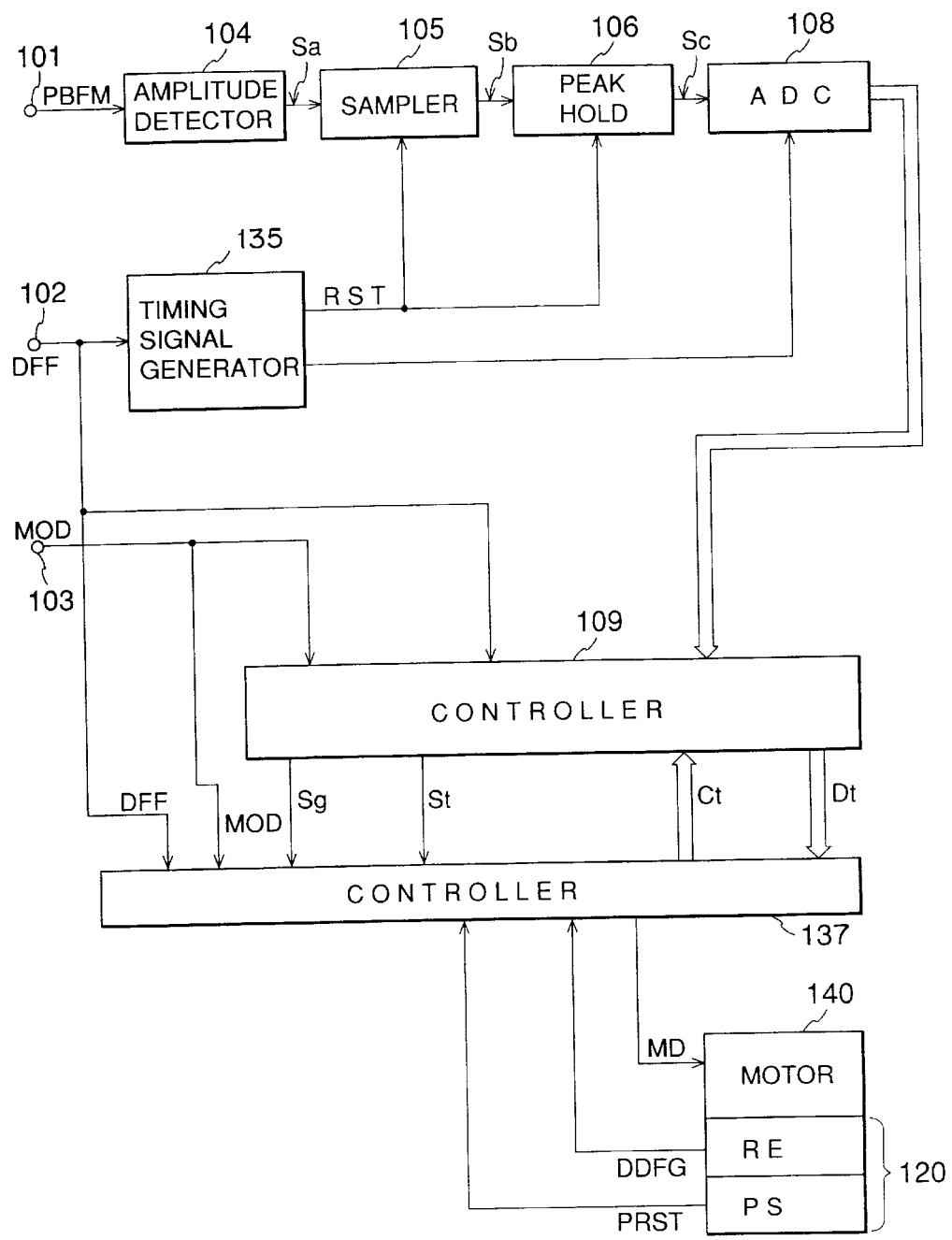
FIG. 32 is a block diagram showing a fourth embodiment of the tacking error data detecting apparatus according to the present invention.
Figure 33:
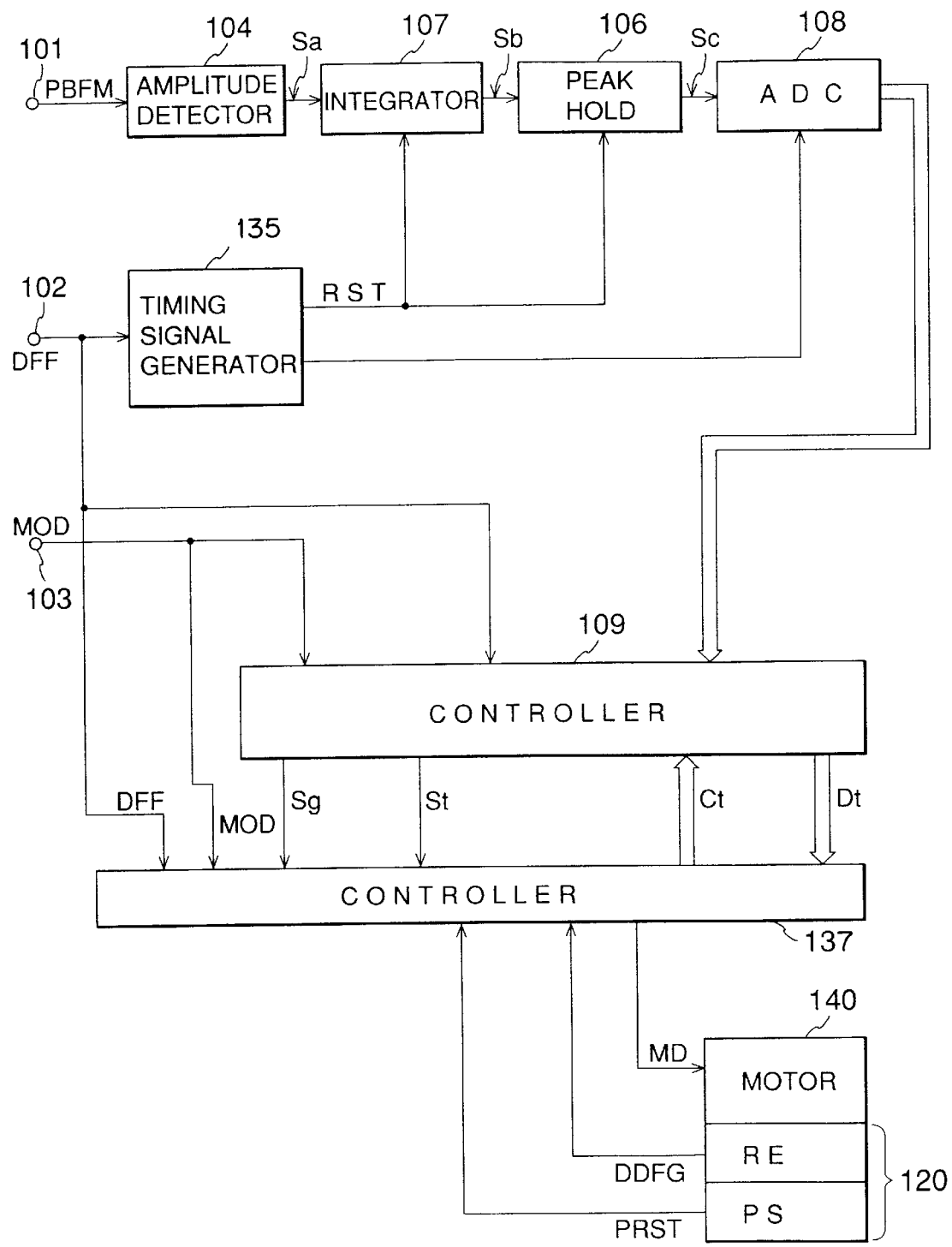
FIG. 33 is a block diagram showing a fifth embodiment of the tacking error data detecting apparatus according to the present invention.

The envelope signal (detected reproduced signal) Sa is applied to a sampler 105 in the case of the tracking error data detecting apparatus for the VTR shown in FIG. 32, but to an integrator 107 in the case of the tracking error data detecting apparatus for the VTR shown in FIG. 33.

Figure 5C:
Figure 5D:
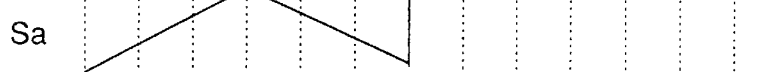
Figure 5E:
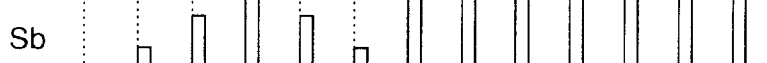
Figure 5F:
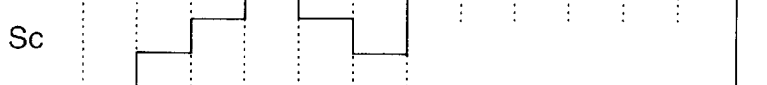

The sampler 105 samples data from the envelope signal Sa by using a reset signal RST (as shown in FIGS. 4C and 5C) generated by a timing signal generator 135 as a sampling pulse (i.e., a sample extracting signal). The sampled data Sb (as shown in FIGS. 4E and 5E) extracted by the detected reproduced signal Sa at the timing of the reset signal RST are applied to a peak hold circuit 106 for holding the peak values thereof, so that a signal Sc (as shown in FIGS. 4F and 5F) is applied from the peak hold circuit 106 to an analog-digital convertor (ADC) 108.

Figure 9A:
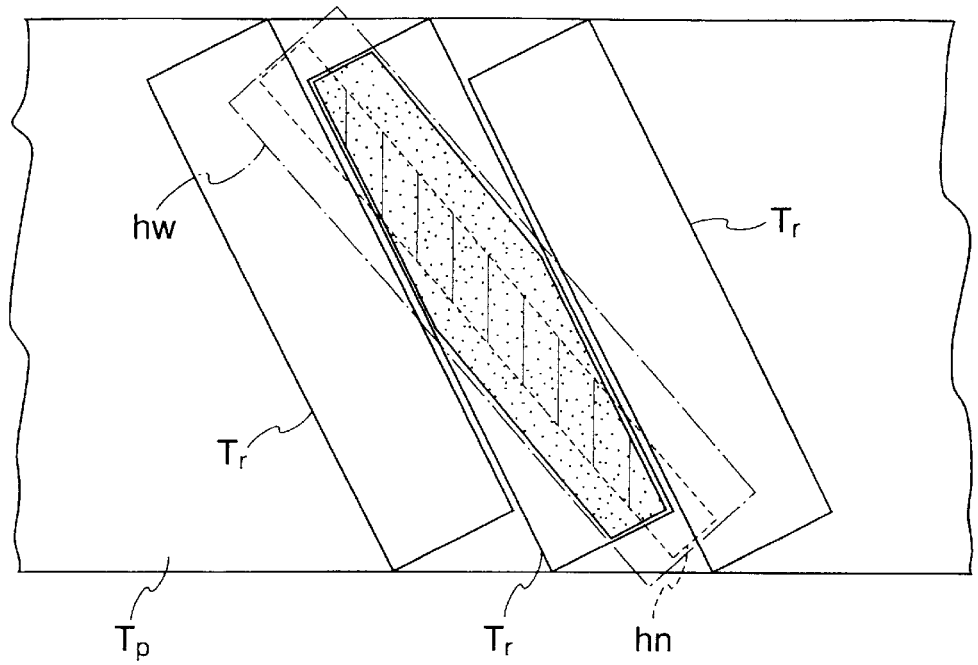
FIGS. 9A and 9B are plane views each for assistance in explaining the relationship between the recorded traces formed on the magnetic tape and the rotary locus of the rotary magnetic head.
Figure 9B:
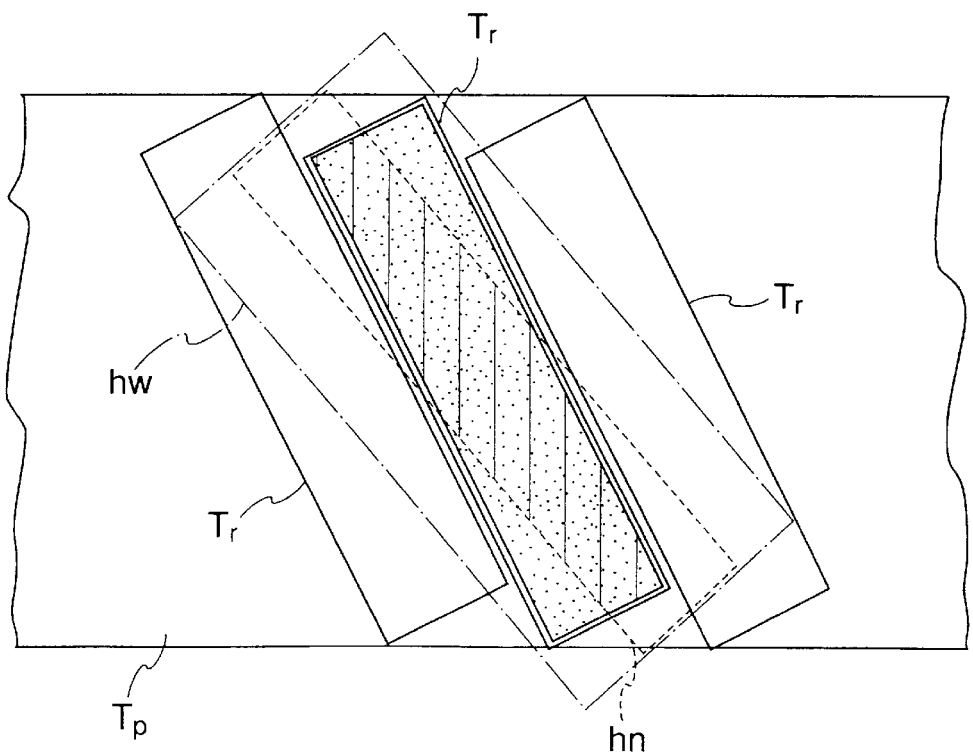

The practical signal examples as shown in FIGS. 4A to 4F and FIGS. 5A to 5F (the same as with the cases shown in FIGS. 6A to 6F and FIGS. 7A to 7E) are obtained when the relationship between the recorded traces (tracks) formed on the magnetic tape and the moving locus of the rotary magnetic heads in reproduction operation is as shown in FIGS. 9A and 9B; in other words, the rotary locus of the rotary magnetic heads are slightly inclined with respect to the direction of the recorded traces formed on the magnetic tape Tp in the reproduction operation.

Figure 34:
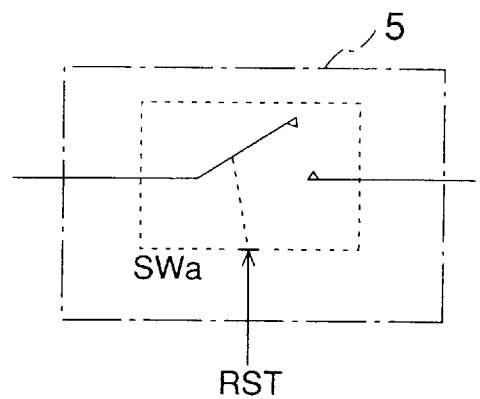
FIG. 34 is a block diagram showing an example of a sampler shown in FIG. 32.

FIG. 34 shows a practical example of the sampler 104 shown in FIG. 32. In FIG. 34, a switch SWa is turned on when the reset signal RST applied as the sampling pulse is at the high level. Therefore, when the reproduced FM signal PBFM as shown in FIGS. 4B and 5B is inputted to the input terminal 101, the detected reproduced signal Sa outputted by the amplitude detector 104 is sampled by the sampler 105 at each timing of the reset signal RST. The obtained sequential sampled data Sb are applied to the peak hold circuit 106. The peak values of the sampled data are held by the peak hold circuit 106 as the signal Sc (as shown in FIGS. 4F and 5F), and then applied to the analog-digital convertor 108.

On the other hand, in the case of the tracking error data detecting apparatus as shown in FIG. 33, when the detected reproduced signal Sa outputted by the amplitude detector 104 is applied to an integrator 107, the integrator 107 integrates the detected reproduced signal Sa at each time interval obtained by dividing one vertical scanning period into N (N: a two or more natural number). And, the integral value signal Sb (as shown in FIGS. 6E and 7E) integrated by the integrator 107 is reset in response to the reset signal RST (as shown in FIGS. 6C and 7C) generated by the timing signal generator 135 at each end timing for each time interval.

The integral value signal Sb of the integrator 107 is given to the peak hold circuit 106. The peak hold circuit 106 holds the integral value signal Sb at each end timing for each time interval of the integrator 107 during one time interval. Therefore, the signal Sc (as shown in FIGS. 6F and 7F) can be applied from the peak hold circuit 106 to the analog-digital convertor 108.

Figure 35:
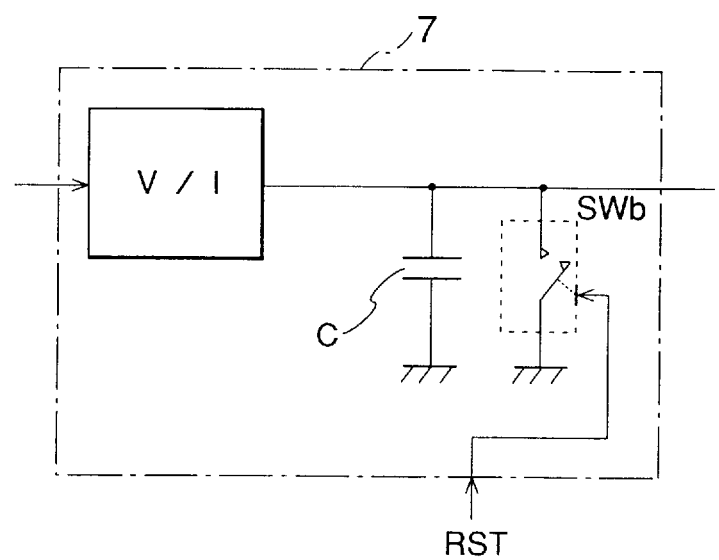
FIG. 35 is a block diagram showing an example of an integrator shown in FIG. 33.

FIG. 35 shows a practical example of the integrator 107 shown in FIG. 33. In FIG. 35, the integrator 107 is composed of a voltage-current convertor V/I and a capacitor C. The integrator 107 accumulates the current outputted from the voltage-current convertor V/I by the capacitor C, and resets or discharges the accumulated charge (integral value) of the capacitor C by a switch SWb turned on in response to the rest signal RST.

The above-mentioned reset signal RST is generated by the timing signal generator 135 on the basis of the reference drum rotation signal DFF supplied to an input terminal 102 at such a timing that the envelope signal Sa of the reproduced FM signal PBFM obtained for each vertical scanning period can be sampled at predetermined portions thereof. In other words, the rest signal RST is generated for each time interval obtained by dividing one vertical scanning period into N (N: a two or more natural number).

By the way, when the rotary locus of the rotary magnetic heads used in the reproduction operation is offset away from a direction of the recorded traces formed on the magnetic tape and to be traced by the rotary magnetic heads, the reproduced signal including data indicative of the above-mentioned offset is reproduced from the magnetic tape Tp on which data are already recorded by the rotary magnetic heads. In this case, the sequential level signals Sc obtained on the basis of the detected reproduced signal Sa (which is obtained by detecting the amplitude of the reproduced frequency-modulated signals can be used as the tacking error data for changing the inclination angles of the drum central axis and the lead ring (Lr) central axis (as shown in FIG. 10A), under control of the control section, so that the respective levels of the signal Sc can be equalized.

On the other hand, however, the followings are understood by seeing the change mode of the signal level of the signal Sc outputted by the peak hold circuit 106 shown in FIGS. 32 and 33 on the time axis. The envelope state Sa of the reproduced FM signal obtained in sequence on the time axis by use of a pair of the rotary magnetic heads (a pair of the first and fourth rotary magnetic heads H1 and H4 or a pair of the second and third rotary magnetic heads H2 and H3) having the same azimuth angles to trace the same recorded traces formed on the recorded magnetic tape Tp is different between one vertical scanning period from t1 to t2 and the other vertical scanning period from t2 and t3. This reason will be described hereinbelow with reference to FIGS. 9A and 9B.

In the case shown in FIGS. 4 to 7, the reproduced FM signals obtained by the rotary magnetic heads during one vertical scanning period between times t1 and t2 includes offset data between the rotary locus of the rotary magnetic heads used for reproduction and the recorded trace direction to be traced by the rotary magnetic heads. On the other hand, however, the reproduced FM signals obtained by the rotary magnetic heads during one vertical scanning period between times t2 and t3 does not include offset data between the rotary locus of the rotary magnetic heads used for reproduction and the recorded trace direction to be traced by the rotary magnetic heads.

Accordingly, in the case shown in FIGS. 4 to 7, it is necessary to use the respective sequential levels obtained on the basis of the detected and reproduced signal Sa (which can be obtained by detecting the amplitude of the reproduced FM signal obtained by the rotary magnetic heads) during one vertical scanning period between times t1 and t2, in order to generate the tracking control signal.

Further, the rotary magnetic head usable to generate the tracking control signal is any one (having a tack width near the width of the recorded traces formed on the recorded magnetic tape Tp) of a pair of the rotary magnetic heads having the same azimuth angles for tracing the recorded traces formed on the recorded magnetic tape Tp in the reproduction operation (i.e., a pair of the first and fourth rotary magnetic heads H1 and H4 or a pair of the second and third rotary magnetic heads H2 and H3), as already explained with reference to FIGS. 9A and 9B.

By the way, as shown in FIG. 10A, the two head sections Ha and Hb are arranged at two 180-degree symmetrically opposite positions on the upper drum Du. Further, the two rotary magnetic heads H1 and H3 for constituting the rotary magnetic head section Ha and the two rotary magnetic heads H2 and H4 for constituting the rotary magnetic head section Hb are constructed in such a way as to have a predetermined track width and a predetermined azimuth angle. In addition, a pair of the rotary magnetic heads to be used is determined according to the operation mode of the VTR. Further, the relationship between the recorded position of the control signals recorded on the magnetic tape and the rotary locus position of the specific rotary magnetic heads is also decided. Furthermore, the period during which the rotary magnetic heads belonging to the rotary magnetic head sections Ha and Hb are scanning the magnetic tape corresponds to the high-level period or the low-level period of the reference drum rotation signal DFF. It is thus possible to allow the period (during which the rotary magnetic heads having a tack width near the width of the recorded traces formed on the recorded magnetic tape Tp are scanning the recorded magnetic tape) to correspond to the high-level period or the low-level period of the reference drum rotation signal DFF.

Now, in the tracking error data detecting apparatus for a VTR according to the present invention as shown in FIG. 32 or 33, the output signal Sc of the peak hold circuit 106 is converted by the analog-digital convertor 108 from the analog signal to the digital signals, respectively, and then supplied to a control section 109 constructed by a microcomputer unit and others. To the control section 109, a mode signal indicative of the travel speed of the magnetic tape determined according to the reproduction operation mode is supplied through the input terminal 103. Further, the reference drum rotation signal DFF is also supplied through the input terminal 102.

To the control section 109, data Ct indicative of the current inclination angle of the drum central axis is given from a control circuit 137. Further, a signal Sg for rotating the motor 140 in the reverse direction is generated by the control section 109, and the generated signal Sg is given to the control circuit 137. Further, data Dt indicative of a target numerical value for stopping the motor in correspondence to the magnetic tape travel speed decided according to the reproduction mode is given from the control section 109 to the control circuit 137. Further, after the numerical data Dt has been given from the control section 109 to the control circuit 137, a signal St for rotating the motor 140 in the forward direction is given from the control section 109 to the control circuit 137. Therefore, the control circuit 137 can controllably drive the motor 140 in a predetermined direction and further stop the motor 140 at a position determined on the basis of the target numerical data Dt for stopping the motor 140. The motor 140 is rotated at a relatively low speed so as to be stopped accurately at a position determined on the basis of the target numerical data Dt for stopping the motor.

Here, there is a condition that the inclination angle of the drum central axis is set to an appropriate angle suitable for the magnetic tape travel speed decided according to the reproduction mode in dependence upon the driving operation of the motor 140. Under the condition, the motor 140 is driven in such a direction that the inclination angle of the drum central axis can be changed to correct the offset value. The motor 140 is driven in that direction when a difference in level among a plurality of sampled signals extracted at N positions of the envelope signal Sa by detecting the amplitude of the reproduced FM signal PBFM obtained by the rotary magnet heads during one vertical scanning period exceeds a predetermined value; that is, when an offset value of the inclination angle between the rotary locus of the rotary magnetic heads and the recorded traces formed on the magnetic tape in the reproduction operation exceeds a predetermined value.

The above-mentioned correct operation is repeated until the difference in level among a plurality of sampled signals extracted at N positions of the envelope signal Sa by detecting the amplitude of the reproduced FM signal PBFM obtained by use of the rotary magnet heads during one vertical scanning period drops below a predetermined value. Further, the mode signal MOD given to the control section 109 via the input terminal 103 in the circuit as shown in FIG. 33 or 34 is data for setting the inclination angle of the drum central axis. Therefore, when the operation mode of the magnetic recording and reproducing apparatus is in the normal recording mode, the inclination angle of the drum central axis is set and fixed to a standard inclination value.

Further, the control circuit 137 shown in FIG. 32 controllably drives the motor 140 in order to change the inclination angle of the drum central axis. In FIG. 32, a block 120 shown in contact with the motor 140 designates a sensor including the rotary encoder RE mounted on the motor 140 and the position sensor PS (e.g., photo-interrupter 50 as shown in FIG. 10B).

The driving and control operation of the motor 140 by the control circuit 137 will be described hereinbelow.

The target numerical data Dt for stopping the motor and the signal St for rotating the motor 140 in the forward direction are both given from the control section 109 to the control circuit 137. Further, the data Ct indicative of the current inclination angle value of the drum central axis is given from the control circuit 137 to the control section 109.

Further, the motor drive signal MD is given from the control circuit 137 to the motor 140. Further, a rotation pulse DDFG generated by the rotary encoder RE and the reference position signal PRST generated by the position sensor PS are both given from the sensor 120 to the control circuit 137.

The practical circuit construction of the control circuit 137 shown in FIGS. 32 and 33 is substantially the same as with the case shown in FIG. 24.

As already explained, the signal indicative of the signal level Sb of the envelope signal Sa corresponding to the reproduced FM signal PBFM obtained at each of N intervals (obtained by dividing one vertical scanning period into the N time intervals) is converted by the analog-digital convertor 108 into digital signals. The converted digital signals are given to the control section 109. The control section 109 discriminates whether the data given by the analog-digital convertor 108 are the data based upon the reproduced FM signal obtained by the rotary magnetic heads having a track width near the width of the recorded traces formed on the recorded magnetic tape Tp; that is, whether the data include tracking error data, and further inputs only the data including the tracking error data thereto.

In the case of the example shown in FIGS. 4F to 7F, the data inputted to the control section 109 are data obtained during one vertical scanning period from time t1 to time t2 (which correspond to the high-level period of the reference drum rotation signal DFF), that is, at each of the time intervals (1) to (6) obtained by dividing the one vertical scanning period into N (N=6 in the case of FIGS. 4F to 7F). Further, the data are inputted to the control section 109 at such a timing that each of the N-unit time intervals (obtained by dividing one vertical scanning period between time t1 and time t2 which correspond to the high-level period of the reference drum rotation signal DFF) ends, that is, whenever the level of the reset signal RST falls.

Further, the control section 109 calculates a difference between the two data given by the analog-digital convertor 108 and further inputted to the control section 109, and decides the target numerical data Dt for stopping the motor at a position which corresponds to the target value of the inclination angle of the drum central axis. The decided numerical data Dt is given to the control circuit 137.

Further, there is a case where the calculated difference between the two sequential signals indicative of the signal levels of the envelope signal (detected and reproduced signal) Sa corresponding to the reproduced FM signal PBFM obtained at each of N intervals during one vertical scanning period is higher than the calculated difference between the two obtained at an interval just before the current interval. In this case, the control section 109 generates a signal Sg (for rotating the motor 140 in the reverse direction) to the control circuit 137, so that the motor 140 can be rotated to change the inclination angle of the drum central axis by a predetermined rate in the direction opposite to the preceding direction (in which the inclination angle of the drum central axis has been changed at the preceding interval).

Further, as already explained, when the signal St for rotating the motor 140 in the forward direction is generated by the control section 109, and then given to the control circuit 137, a set-reset flip-flop 17 (shown in FIG. 24) of the control circuit 137 is set in response to the signal St.

Further, when the signal Sg for rotating the motor 140 in the reverse direction is generated by the control section 109, and then given to the control circuit 137, a set-reset flip-flop 18 (shown in FIG. 24) of the control circuit 137 is set in response to the signal Sg.

In FIG. 24, when the set-reset flip-flop 17 is set, a high-level signal is outputted from a Q output terminal thereof to turn on a switch SW1. When the switch SW1 is turned on, since a positive power supply 22 is connected to a motor drive circuit 24, the motor drive signal MD for rotating the motor 140 in the forward direction is given from the motor drive circuit 24 to the motor 140. When the motor 140 is rotated in the forward direction, the first inclination rate change screw 39 and the second inclination rate change screw 45 both shown in FIG. 10A are driven via the gears 40 and 41 and the gears 43 and 44, respectively. The inclination angle of the drum central axis and the inclination angle of the lead ring (Lr) central axis thus can be both changed.

On the other hand, in FIG. 24, when the set-reset flip-flop 18 is set, a high-level signal is outputted from a Q output terminal thereof to turn on a switch SW3. When the switch SW3 is turned on, since a negative power supply 23 is connected to a motor drive circuit 24, the motor drive signal MD for rotating the motor 140 in the reverse direction is given from the motor drive circuit 24 to the motor 140. When the motor 140 is rotated in the reverse direction, the first inclination rate change screw 39 and the second inclination rate change screw 45 both shown in FIG. 10A are driven via the gears 40 and 41 and the gears 43 and 44, respectively. The inclination angle of the drum central axis and the inclination angle of the lead ring (Lr) central axis thus can be both changed.

What is claimed is:

1. A video tape recorder, comprising:

a drum for winding a magnetic tape therearound;

a capstan motor and a drum motor linked with the drum, both motors for traveling the magnetic tape;

two rotary magnetic heads arranged adjacent to each other relative to the magnetic tape and having two different azimuth angles;

detecting means for receiving one reproduced signal of higher signal level selected from two modulated signals reproduced by the two rotary magnetic heads and for detecting the selected and received signal to output a detected reproduced signal;

signal generating means for generating sampling signals each having a signal level corresponding to a signal level of the detected reproduced signal outputted by the detecting means on the basis of the reproduced signal obtained by the selected rotary magnetic head, only during a period while a predetermined one of the two rotary magnetic heads is being selected in response to a head select signal, at each of time intervals obtained by dividing one vertical scanning period into a two or more natural number N;

inclination driving means for inclining a central axis of the drum in such a way that the respective signal levels of the sampling signals satisfy a predetermined relative relationship with respect to one another, when recorded signal is reproduced by traveling the magnetic tape at a travel speed different from another travel speed of the magnetic tape in recording operation; and control means for changing rotation phase of the capstan motor relative to a reference drum rotation signal of said drum motor.

2. The video tape recorder of claim 1, wherein said signal generating means comprises a sampler including:

a first switch being turned on to pass the detected reproduced signal, only when a given sampling pulse is at a predetermined level at each of the time intervals; and a second switch connected to the first switch and being turned on only when the head select signal is at a predetermined logical level opposite to that of the sampling pulse, to pass the detected reproduced signal passed through the first switch, the detected reproduced signals passed through the second switch being outputted by the sampler as sampling values.

3. The video tape recorder of claim 1, wherein said signal generating means comprises an integrator including:

a voltage-current convertor for receiving the detected reproduced signal and generating a current signal;

a first switch being turned on only when the signal level of the head select signal is at a predetermined level to p ass the current signal;

a capacitor connected between the first switch and ground, for accumulating the current signal passed through the first switch; and a second switch connected in parallel to the capacitor, and being turned on only when a given reset signal is at a predetermined logical level opposite to that of the head select signal at each of the time interval, to discharge the current signals accumulated by the capacitor, the current signals accumulated by the capacitor being outputted as integral values.

4. The video tape recorder of claim 1, wherein the inclination driving means comprises:

a motor for inclining the drum;

means for deciding a target inclination angle of a central axis of the drum on the basis of a difference in signal level between the sampling signals;

means for deciding a correction rate of the inclination angle of the central axis of the drum on the basis of a difference in signal level between the sampling signals;

a driving circuit for driving the motor according to the correction rate, to change the inclination angle of the central axis of the drum; and comparing means for comparing the target inclination angle with the changed inclination angle and, when both match, for outputting a signal for stopping the motor to said driving circuit.

5. The video tape recorder of claim 1, wherein the control means comprises:

a comparator for comparing the reference drum rotation signal with a reference comparison signal indicative of a target rotation phase of the capstan motor, to output an error signal;

a frequency-voltage convertor for converting the rotational frequency of the capstan motor into a voltage signal corresponding thereto;

a subtracter for subtracting the voltage signal from the error signal, to output a correction signal; and a motor drive circuit for applying a motor drive signal corresponding to the correction signal to the capstan motor, to bring the rotation phase close to the target rotation phase.

6. The video tape recorder of claim 1, further comprising means for activating the inclination driving means and the control means alternately in sequence.

7. A video tape recorder, comprising:

a drum for winding a magnetic tape therearound;

a capstan motor and a drum motor linked with the drum, both motors for traveling the magnetic tape;

two rotary magnetic heads arranged adjacent to each other relative to the magnetic tape and having two different azimuth angles;

detecting means for receiving one reproduced signal of higher signal level selected from two modulated signals reproduced by the two rotary magnetic heads and for detecting the selected and received signal to output a detected reproduced signal;

first signal generating means for generating sampling signals each having a signal level corresponding to a signal level of the detected reproduced signal, at each of time intervals obtained by dividing one vertical scanning period into a two or more natural number N;

second signal generating means for generating a tracking error signal, on the basis of a first sampling signal generated during a period while a predetermined one of the two rotary magnetic heads is being selected in response to a head select signal and a polarity-inverted second sampling signal generated during another period while the remaining other of the rotary magnetic heads is being selected in response to the head select signal;

inclination driving means for inclining a central axis of the drum in such a way that the respective signal levels of the sampling signals satisfy a predetermined relative relationship with respect to one another in cooperation with the tracking error signal, when recorded signal is reproduced by traveling the magnetic tape at a travel speed different from another travel speed of the magnetic tape in recording operation; and control means for changing rotation phase of the capstan motor relative to a reference drum rotation signal of the drum motor.

8. The tape recorder of claim 7, wherein in the case where the two rotary magnetic heads are a first magnetic head with a positive azimuth angle and a second magnetic head with a negative azimuth angle, the second signal generating means generates a tracking error signal for the first magnetic head by subtracting a minimum value of the sampling signals generated when the first magnetic head is in off-track state from the first sampling signal, on the other hand, the second signal generating means generates a tracking error signal for the second magnetic head by subtracting the second sampling signal from a maximum value of the sampling signals generated when the second magnetic head is in on-track state.

9. The tape recorder of claim 7, wherein in the case where the two rotary magnetic heads are a first magnetic head having a positive azimuth angle and a second magnetic head having a negative azimuth angle, the second signal generating means normalizes the first and second sampling signals so that maximum values of the first and second sampling signals correspond to a predetermined value, respectively, the second signal generating means generates a tracking error signal for the first magnetic head by subtracting a minimum value of the sampling signals generated when the first magnetic head is in off-track state from the normalized first sampling signal, on the other hand, the second signal generating means generates a tracking error signal for the second magnetic head by subtracting the normalized second sampling signal from a maximum value of the sampling signals generated when the second magnetic head is in on-track state.

10. The video tape recorder of claim 7, wherein the inclination driving means comprises:

a motor for inclining the drum;

means for deciding a target inclination angle of a central axis of said drum on the basis of a difference in signal level between the sampling signals;

means for deciding a correction rate of the inclination angle of the central axis of the drum on the basis of a difference in signal level between the sampling signals;

a driver for driving the motor according to the correction rate, to change the inclination angle of the central axis of the drum; and comparing means for comparing the target inclination angle with the changed inclination angle and, when both match, for outputting a signal for stopping the motor to the driver.

11. The video tape recorder of claim 7, wherein the control means comprises:

a comparator for comparing the reference drum rotation signal with a reference comparison signal indicative of a target rotation phase of the capstan motor, to output an error signal;

a frequency-voltage convertor for converting the rotational frequency of the capstan motor into a voltage signal corresponding thereto;

a subtracter for subtracting the voltage signal from the error signal, to output a correction signal; and a driver for applying a motor drive signal corresponding to the correction signal to the capstan motor, to bring the rotation phase close to the target rotation phase.

12. A video tape recorder, comprising:

a drum for winding a magnetic tape;

a first rotary magnetic head disposed at a predetermined position along a circumference of the drum and having a first azimuth angle;

a second rotary magnetic head disposed at a 180-degree symmetrically opposite position relative to the first magnetic tape along the circumference of the drum and having a second azimuth angle different from the first azimuth angle;

a third rotary magnetic head disposed adjacent to the first magnetic head along the circumference of the drum and having the second azimuth angle;

a fourth rotary magnetic head disposed at a 180-degree symmetrically opposite position relative to the third magnetic tape along the circumference of the drum and having the first azimuth angle;

detecting means for detecting reproduced signals obtained by the magnetic heads when the magnetic tape is kept stopped or when the magnetic tape is moved at a travel speed n-times higher than another travel speed of the magnetic tape in recording operation, where n is a natural number, and for outputting the detected reproduced signals;

signal generating means for generating sampling signals each having a signal level corresponding to a signal level of each of the detected reproduced signals, at each of time intervals obtained by dividing one vertical scanning period into a two or more natural number N;

signal extracting means for extracting one sampling signal from a plurality of the sampling signals as tracking error data, on the basis of the reproduced signal obtained by one magnetic head having a track width close to recorded trace width formed on the magnetic tape, selected from the first to fourth magnetic heads; and inclination driving means for inclining a central axis of the drum according to the tracking error data so that difference in signal level between the sampling signals at each of the time intervals can be determined below a predetermined value.

13. The video tape recorder of claim 12, wherein the signal generating means comprises a switch being turned on only when a given sampling pulse is at a predetermined level at each of the time intervals, to pass the detected and reproduced signals as the sampling signals.

14. The video tape recorder of claim 12, wherein the signal generating means comprises an integrator including:

a voltage-current convertor for receiving the detected reproduced signals and generating a current signal;

a capacitor connected between the first switch and ground, for accumulating the current signal; and a switch connected in parallel to the capacitor, and being turned on only when a given reset signal is at a predetermined logical level at each of the time interval, to discharge the current signal accumulated by the capacitor, integral values of the current signal accumulated by the capacitor being outputted as the sampling signals.

15. The video tape recorder of claim 12, wherein the inclination driving means comprises:

a motor for inclining the drum;

means for deciding a target inclination angle of a central axis of the drum on the basis of a difference in signal level between the sampling signals;

means for deciding a correction rate of the inclination angle of the central axis of the drum on the basis of a difference in signal level between the sampling signals;

a driver for driving the motor according to the correction rate, to change the inclination angle of the central axis of the drum; and means for comparing the target inclination angle with the changed inclination angle and, when both match, for outputting a signal for stopping the motor to the driver.

* * * * *